(12) United States Patent
Arcolano et al.

(10) Patent No.: US 11,488,081 B2
(45) Date of Patent: Nov. 1, 2022

(54) SYSTEMS AND METHODS FOR OPTIMIZING AUTOMATED MODELLING OF RESOURCE ALLOCATION

(71) Applicant: Orthogonal Networks, Inc., Boston, MA (US)

(72) Inventors: Nicholas Arcolano, Watertown, MA (US); Glenn Stephen Barnett, Needham, MA (US); Philip Joseph Braden, Washington, DC (US); David James Gourley, Boston, MA (US); Matthew Paul Klein, Hingham, MA (US); Andrew Man-Hon Lau, Cambridge, MA (US); Alexander Stephen Metzger, Boston, MA (US)

(73) Assignee: Orthogonal Networks, Inc., Boston, MA (US)

( * ) Notice: Subject to any disclaimer, the term of this patent is extended or adjusted under 35 U.S.C. 154(b) by 0 days.

(21) Appl. No.: 16/556,507

(22) Filed: Aug. 30, 2019

(65) Prior Publication Data
US 2020/0074369 A1 Mar. 5, 2020

Related U.S. Application Data

(60) Provisional application No. 62/777,506, filed on Dec. 10, 2018, provisional application No. 62/725,741, filed on Aug. 31, 2018.

(51) Int. Cl.
*G06Q 10/06* (2012.01)
*G06N 20/00* (2019.01)
*G06F 8/71* (2018.01)

(52) U.S. Cl.
CPC ........ *G06Q 10/06313* (2013.01); *G06F 8/71* (2013.01); *G06N 20/00* (2019.01)

(58) Field of Classification Search
CPC ..... G06Q 10/06313; G06N 20/00; G06F 8/71
USPC .......................................... 717/102
See application file for complete search history.

(56) References Cited

U.S. PATENT DOCUMENTS

| | | | |
|---|---|---|---|
| 10,467,132 B1 * | 11/2019 | Chatterjee | G06F 11/3692 |
| 10,565,234 B1 * | 2/2020 | Sims | G06F 40/30 |
| 10,592,302 B1 * | 3/2020 | Hinrichs | G06F 9/54 |
| 2012/0079449 A1 * | 3/2012 | Sanderson | G06Q 10/103 717/102 |
| 2014/0089887 A1 * | 3/2014 | Bhattacharyya | G06Q 10/06 717/102 |
| 2015/0213360 A1 * | 7/2015 | Venanzi | G06N 20/00 706/12 |
| 2015/0339613 A1 * | 11/2015 | Mendis | G06Q 10/06393 717/102 |

(Continued)

*Primary Examiner* — Lewis A Bullock, Jr.
*Assistant Examiner* — Theodore E Hebert
(74) *Attorney, Agent, or Firm* — Wolf, Greenfield & Sacks, P.C.

(57) ABSTRACT

Systems, methods, and storage media for optimizing automated modelling of resource allocation are disclosed. Exemplary implementations include operations for: receive or retrieve by a computer system, operational information associated with a plurality of users; allocate, by the computer system, at least a first time portion to at least a first task associated with a first user of the plurality of users based on analysis of the operational information; and dynamically modify, by the computer system, the first time portion responsive to receiving or retrieving additional operational information over time.

24 Claims, 37 Drawing Sheets

(56) References Cited

U.S. PATENT DOCUMENTS

| | | | | |
|---|---|---|---|---|
| 2016/0321585 A1* | 11/2016 | Saraswat | .......... | G06Q 10/06311 |
| 2017/0098181 A1* | 4/2017 | Herman | ................ | G06N 5/003 |
| 2018/0322412 A1* | 11/2018 | Elliott, Jr | ............. | G06Q 10/103 |
| 2019/0050812 A1* | 2/2019 | Boileau | ................ | G06F 3/0482 |
| 2019/0073293 A1* | 3/2019 | Sharma | ................ | G06F 11/008 |
| 2019/0121719 A1* | 4/2019 | Hamon | ............... | G06F 11/3664 |
| 2020/0074369 A1* | 3/2020 | Arcolano | ............... | G06N 20/10 |

* cited by examiner

FIG. 32

SYSTEMS AND METHODS FOR OPTIMIZING AUTOMATED MODELLING OF RESOURCE ALLOCATION

RELATED APPLICATIONS

This application is a Non-Provisional of Provisional (35 USC 119(e)) of U.S. Application Ser. No. 62/777,506, filed Dec. 10, 2018, entitled "SYSTEMS AND METHODS FOR OPTIMIZING AUTOMATED MODELLING OF RESOURCE ALLOCATION". This application is a Non-Provisional of Provisional (35 USC 119(e)) of U.S. Application Ser. No. 62/725,741, filed Aug. 31, 2018, entitled "SYSTEMS AND METHODS FOR OPTIMIZING AUTOMATED MODELLING OF RESOURCE ALLOCATION". The entire contents of these applications are incorporated herein by reference in their entirety.

BACKGROUND

Software project management and software engineering has conventionally been a patchwork of guesses and assumptions with some specific development tools thrown into the mix that solve targeted problems. Typically, the available tools are directed to bug/issue resolution and/or versioning and management of code development. Although other tools exist for helping organize team-level cooperation and management, various conventional approaches do not provide an aggregated view.

SUMMARY

It is realized that a need exists for a holistic approach to software engineering that enables utilization of existing tools and data, and translates that existing data into useable heuristics on the work force developing the software, supporting the software, and resolving issues with the software. There is a further need for systems and methods that provide benchmarking of productivity of a workforce (e.g., measuring and/or tracking productivity of a work force as it executes respective tasks).

Various embodiments provide intelligent algorithms or learning algorithms that map existing information on currently tracked work items (a wholly incomplete data set) to a container data object (e.g., a card) and that further generates inference information to establish a usable set of data. In some embodiments, tasks or operations performed by users can be translated into resource allocations (e.g., time slices, units of work, etc.) that provide, for example, an aggregate view of how various developers and engineers spend their time. Stated broadly, the system is configured to interpolate various signals of work being performed (time being one—but also including "effort required"). For example, through the operations discussed below, the system provides a holistic view of what employee X costs and insights into how that cost can be attributed to the work produced.

In various examples, this translation is made possible by the system automatically without buy in or participation by the engineers. The need for buy in and participation plagues conventional approaches and prevents generation of accurate results. Some conventional approaches for tracking work simply fail to provide a usable data set, for example, for managing software engineering at a project level. Attempts to force explicit, granular tracking (e.g., hourly tracking of work performed) are met with resistance and have thus far failed to produce a workable model. Further, automation of time allocation via automatic data capture of associated information, inference modelling, probabilistic linkage, signal strength determination, etc., eliminate significant error and under or inaccurate reporting/data collection of known approaches. Thus, conventional system and conventional implementation cannot perform these functions.

It is further realized that existing tracking information can be used to develop an approximate model that reflects work performed as a timeline or time period for each event or task that can be associated with respective engineers. Various embodiments execute the learning algorithms to correlate existing or available task based information to generate allocations of work or time for respective members of a workforce. In various aspect, the systems automatic information capture yields an incomplete data set that is extrapolated by further information capture, probabilistic and learning based models, various analysis kernels, that yield a synthesized data set of probabilistic linkages that complete the data set into a useable data object.

In various examples, the system generated allocations eliminate the need for user participation and buy in beyond the source code version control and issue resolution tasks that various engineering teams are accustomed to performing. According to one aspect, the system automates allocation of the required effort to accomplish a given task. Aggregating the allocations over a broader set of tasks (e.g., a development project) provides insight into specific costs and opportunities to optimize execution.

According to some embodiments, the system maps existing and inferenced information to respective container data objects, where the data objects establish an approximate definition of actual work performed at a given time period by respective users based on the execution of allocation algorithms. The model is dynamically adjusted as additional information is received or retrieved by the system, thus the model becomes increasingly accurate over time. In some examples, the model of actual work can be used to generate visualizations of actual work performed, and provide visual insight into work day time periods for respective users. Various embodiments, provide intuitive user interfaces that establish the boundaries of the approximate model, while at same time allow reviewers/administrators the ability to manage and measure a massive work force—while eliminating the need for explicit time based tracking by the work force. This departure from conventional approaches significantly reduces the burdens and corresponding computations required by various conventional approaches, and in further embodiments reduces the need for manual data entry and/or collection. Some further embodiments enable generation of models that are more accurate and comprehensive than conventional approaches. In further example, where available data is incomplete, the system is configured to generate a model of the complete data and enable a view of a complete data set from the incomplete information (these functions cannot be executed by various conventional approaches, which, for example, fail to operate when incomplete date is presented).

According to one aspect a system for optimizing automated modelling of resource allocation is provided. The system comprises at least one processor operatively connected to a memory, a capture component, executed by the at least one processor, configured to receive or retrieve operational information associated with a plurality of users (e.g., JIRA ticketing/tracking information), a correlation component, executed by the at least one processor, configured to allocate at least a first time portion to at least a first task associated with a first user of the plurality of users based on analysis of the operational information, and an adjustment component, executed by the at least one processor, configured to dynamically modify the first time portion responsive to receiving or retrieving additional operational information over time.

According to one embodiment, the system further comprises a correlation component, executed by the at least one processor, configured to allocate a second time portion to a second task associated with a first user of the plurality of users based on analysis of the operational information. According to one embodiment, the system further comprises a correlation component, executed by the at least one processor, configured to allocate a third time portion to a third task associated with a first user of the plurality of users based on analysis of the operational information According to one embodiment, the capture component includes at least a first application programming interface (API) configured to manage receiving or retrieving the operational information from a software version control subsystem (e.g., GITHUB). According to one embodiment, the capture component includes at least a second API configured to manage receiving or retrieving the operational information from a software ticketing system (e.g., JIRA).

According to one embodiment, the capture component includes a plurality of APIs, wherein respective APIs are configured to manage receiving or retrieving the operational information from a plurality of respective data sources including at least software version control subsystems, software ticketing subsystems, time tracking subsystems (e.g., TOGGL), code repository subsystems (e.g., JIRA, BITBUCKET, etc.), software development/messaging subsystems (e.g., TRELLO), and project management subsystems (e.g., TEAMWEEK). According to one embodiment, the correlation component is configured to associate a plurality of users identities across a plurality of information sources to respective users and respective task based information. According to one embodiment, the correlation component is configured to allocate a plurality of time portions to a respective first user based on analysis of operational information captures across the plurality of data sources.

According to one embodiment, the system is further configured to dynamically adjust the plurality of time portions and a plurality of tasks allocated to the respective user by reducing, adding, or eliminating time portions and/or tasks responsive to additional operational information or additional data sources of operational information. According to one embodiment, the system is further configured to dynamically weight operational information being analyzed responsive to corroboration of two or more data sources. According to one embodiment, the system is further configured to dynamically adjust weights associated with operational information responsive to corroboration of a first data source, and dynamically adjust the weights associated with operational information to corroboration of a second data source (for example based on executing algorithms, machine learning, and/or manual adjustment, among other options).

According to one embodiment, responsive to adjusted weights the correlation component is further configured to re-determine the first time portion for at least the first task associated with the first user of the plurality of users. According to one embodiment, re-determination of the first time portion includes re-determination of a set of dependent time periods. According to one embodiment, the set of dependent time periods is automatically determined by the correlation component. According to one embodiment, the system is further configured to dynamically adjust weights to operational information responsive to identifying correlations between at least two or more of the data sources. According to one embodiment, the correlations component is further configured to establish a relative time According to one embodiment, the correlation component is further configured to build associations between the operational information (e.g., digital signals indicative of work performed by engineers, etc.) and inferred time periods required to accomplish the work.

According to one embodiment, the correlation component is further configured to automatically build dependencies between elements of the operational information and overlapping or adjacent time periods. According to one embodiment, the correlation component is further configured to assign a plurality of time periods to groupings of operational information based at least in part on the dependencies between the elements of operational information. According to one embodiment, the correlation component is further configured to identify time periods having no associated signal (e.g., operational information) and preferentially assign inferred time periods associated with respective users to time periods having no associated signal. According to one embodiment, the correlation component is further configured to preferentially re-determined allocation of a plurality of time periods to time periods having no associated signal.

According to one embodiment, the correlation component is further configured to apply a classification matrix to operational data received from a first data source (e.g., JIRA), and the application of the classification matrix includes assigning a time period ranges including a weighted minimum or weighted maximum time period associated with a classification of a type of task associated with the first data source. According to one embodiment, the correlation component is further configured to automatically classify operational data received from a plurality of data sources and determine a candidate time period or range of candidate time periods responsive to the automatic classification of the operational data. According to one embodiment, the classification and determination of the candidate time period or candidate range of time periods is determine as a stage of a final allocation of at least the first time portion to at least the first task associated with a first user.

According to one aspect, a method for optimizing automated modelling of resource allocation is provided. The method comprises receiving or retrieving, by a computer system, operational information associated with a plurality of users (e.g., JIRA ticketing/tracking information), allocating, by the computer system, at least a first time portion to at least a first task associated with a first user of the plurality of users based on analysis of the operational information, and dynamically modifying, by the computer system, the first time portion responsive to receiving or retrieving additional operational information over time.

According to one embodiment, the act of allocating includes allocating, by the computer system, a second time portion to a second task associated with a first user of the plurality of users based on analysis of the operational information. According to one embodiment, the act of allocating includes allocating, by the computer system, a third time portion to a third task associated with a first user of the plurality of users based on analysis of the operational information. According to one embodiment, the method further comprises executing at least a first application programming interface (API), and managing, by the first API, receiving or retrieving the operational information from a software version control subsystem (e.g., GITHUB).

According to one embodiment, the method further comprises executing a second API, and managing, by the second API, receiving or retrieving the operational information from a software ticketing system (e.g., JIRA).

According to one embodiment, the method further comprises executing a plurality of APIs, and managing, by the plurality of APIs, receiving or retrieving the operational information from a plurality of respective data sources including at least software version control subsystems, software ticketing subsystems, time tracking subsystems (e.g., TOGGL), code repository subsystems (e.g., JIRA, BITBUCKET, etc.), software development/messaging subsystems (e.g., TRELLO), and project management subsystems (e.g., TEAMWEEK). According to one embodiment, the act of allocating includes associating, by the computer system, a plurality of users identities across a plurality of information sources to respective users and respective task based information. According to one embodiment, the act of allocating includes allocating, by the computer system, a plurality of time portions to a respective first user based on analysis of operational information captured across the plurality of data sources.

According to one embodiment, act of dynamically modifying includes dynamically adjusting, by the computer system, the plurality of time portions and a plurality of tasks allocated to the respective user, wherein dynamically adjusting includes acts of reducing, adding, or eliminating time portions and/or tasks, by the computer system, responsive to processing, by the computer system, additional operational information or additional data sources of operational information. According to one embodiment, the method further comprises an act of dynamically weighting, by the computer system, operational information being analyzed responsive to corroboration of two or more data sources. According to one embodiment, the method further comprises dynamically adjusting, by the computer system, weights associated with operational information responsive to corroboration of a first data source, and dynamically adjusting the weights associated with operational information to corroboration of a second data source.

According to one embodiment, the method further comprises an act of re-determine, by the computer system, the first time portion for at least the first task associated with the first user of the plurality of users responsive to adjusted weights. According to one embodiment, the act of re-determining of the first time portion includes re-determining, by the computer system, of time periods assigned to a set of dependent time periods. According to one embodiment, the method further comprises determining by the computer system a set of dependent time periods associated with the operational information. According to one embodiment, the method further comprises dynamically adjusting weights to operational information responsive to identifying correlations between at least two or more of the data sources. According to one embodiment, the correlations component is further configured to establish a relative time period for at least a first user based at least in part on a time period assigned to another task of the first user. According to one embodiment, the method further comprises generating, by the computer system, associations between the operational information (e.g., digital signals indicative of work performed by engineers, etc.) and inferred time periods required to accomplish the work.

According to one embodiment, the method further comprises automatically generating, by the computer system, dependencies between elements of the operational information and overlapping or adjacent time periods. According to one embodiment, the method further comprises assigning, by the computer system, a plurality of time periods to groupings of operational information based at least in part on the dependencies between the elements of operational information. According to one embodiment, the method further comprises identifying, by the computer system, time periods having no associated signal (e.g., operational information) and preferentially assigning, by the computer system, inferred time periods associated with respective users to time periods having no associated signal. According to one embodiment, the method further comprises preferentially re-determining, by the computer system, allocation of a plurality of time periods to time periods having no associated signal. According to one embodiment, the act of allocating includes: applying, by the computer system, a classification matrix to operational data received from a first data source (e.g., JIRA); and assigning, by the computer system, a time period range including a weighted minimum or weighted maximum time period associated with a classification of a type of task associated with the first data source.

According to one embodiment, the act of allocating includes automatically classifying, by the computer system, operational data received from a plurality of data sources, and determining, by the computer system, a candidate time period or range of candidate time periods responsive to the automatic classification of the operational data. According to one embodiment, the act of allocation includes executing of at least a first stage for classification and determination of the candidate time period or candidate range of time periods and execution of at least a subsequent stage for determination of a final allocation of at least the first time portion to at least the first task associated with a first user. According to one embodiment, the method further comprises an act of identifying probable intra-system data connections and/or linkages that are not present in the data itself. According to one embodiment, the method further comprises an act of soliciting human confirmation regarding implied intra-system data connections and/or linkages.

According to one embodiment, the method further comprises an act of balancing and weighting a multitude of signal connections (including for example explicit and/or implicit connections—which can be produced or identified by automatic analysis). According to one embodiment, the method further comprises an act of creating organizational definitions (including for example, groupings of information, issues, and scope that are useful to the business, among other options) based on executing machine learning algorithms. According to one embodiment, the method further comprises projecting time spent, cost incurred, and/or feature scope delivered on a time scale based on a generated allocations model.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE FIGURES

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIGS. 19-36 illustrate example screen shots of user interfaces according to various embodiments.

DETAILED DESCRIPTION

Various aspects and embodiments are directed to a system and or user interface for mapping existing information on currently tracked work items (a wholly incomplete data set) to a set of container data objects (e.g., a card), where the system is configured to further generate inference information to establish a usable set of data. In various embodiments, tasks or operations performed by users can be translated into resource allocations (e.g., time slices) that together provide an aggregate interpretation of how various developers and engineers spend their time. In various examples, these allocations are made possible based on intelligent algorithms or learning algorithms that enable mapping of existing data sources, generation of inference information and construction of an approximate but useable data set. In various embodiments, these operations can be executed transparently without buy in or participation by the operators associated with execution of respective tasks.

Figure 17:
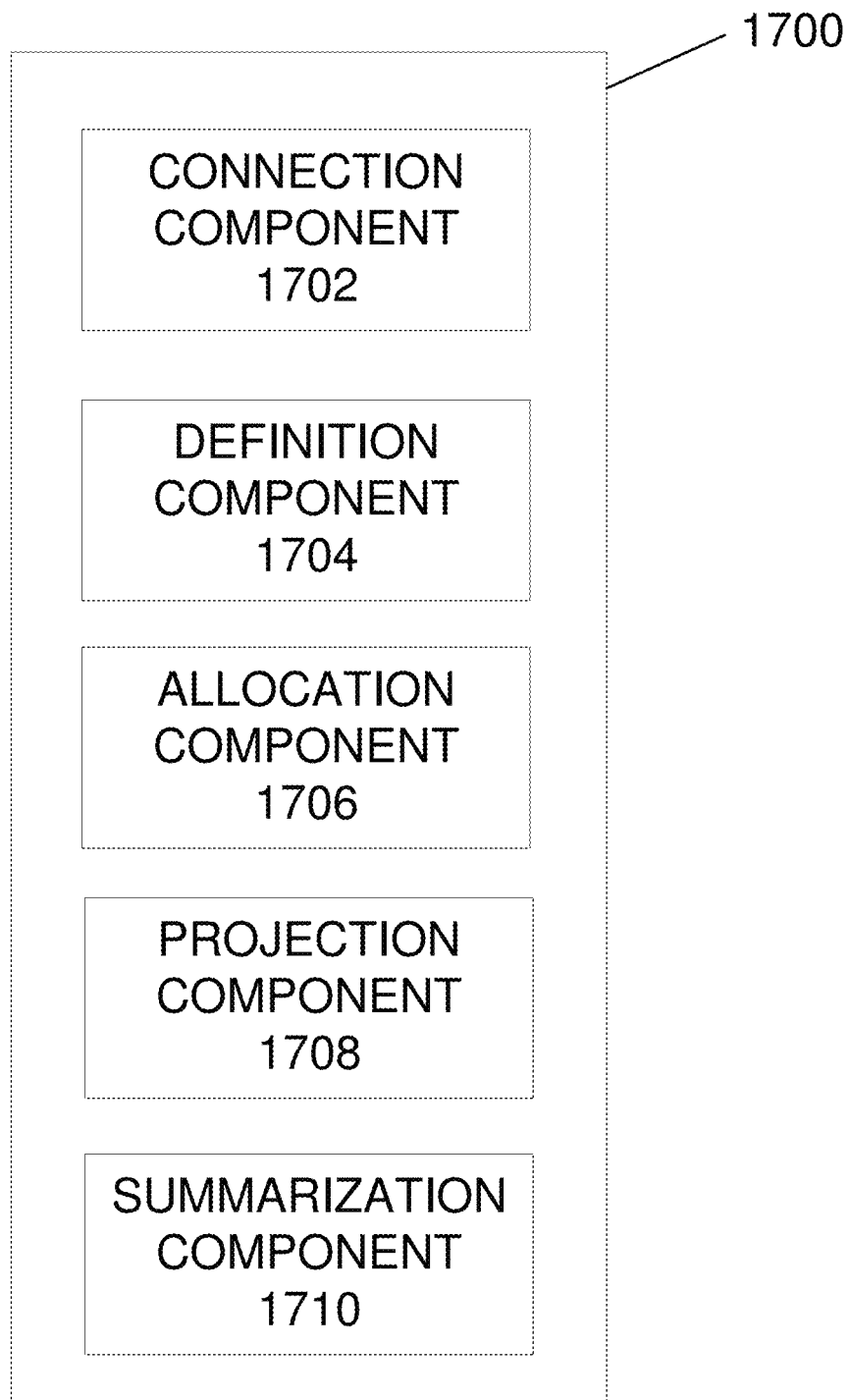
FIG. 17 is a block diagram of an example embodiment of the system.

FIG. 17 is a block diagram of example allocation system 1700. System 1700 can include a plurality of system components each configured for a specialized task or set of tasks as discussed below. In some embodiments, the system can also be configured to execute the same functions with or without the specialized components. According to one embodiment, the system 1700 can be comprised of five components (and can, for example, include additional components or fewer components). For example the system can include a connection component 1702 configured to capture different types of data from a variety of different tracking systems (e.g., JIRA). According to some embodiments, the connection subsystem or component is configured to ingest different types of data from different types of businesses which include Jira (e.g., Issue Workflow Management), GitHub and Bitbucket (e.g., Source Code Version Control), Workday (HR data), Outlook (Schedule data), among other options. It is realized that in various examples virtually any system engineers interact with or which holds information about the development team is a potential source of information that can be captured and allocated to projects, work items, etc.

According to some embodiments, the connection subsystem can be configured to establish meaningful links between the different subsystems and/or different data management systems used by developers or engineers. With the links or associations the system can provide insight that a unit of source code corresponds to a new feature in Jira, or that a day of low source code productivity correlated to a number of candidate interviews on an engineer's calendar. For example, links between data in connected systems can be made:

Via explicit means, such as when the systems themselves provide ways to link to elements within each other;

Via implicit means, such as when the systems infers a correlation with a specific person's actions on a specific time and date (e.g., on different, unconnected systems);

Via conventions, such as Git Flow, which allows a unit of source code to be matched by key to an issue in Jira by including the Jira issue key in the title or branch name of the Pull Request;

Via solicited signal, in which our system reaches out to involved people and explicitly asks them to formulate connections (e.g. "This source code was not linked to an issue explicitly—please choose which issue it should be linked to from the list below);

Via machine learning, using learned patterns from companies individually or the industry at large; and/or By balancing all the different means of linkage above to produce an aggregate high probability linkage.

Various embodiments of the system and/or connection subsystem can be configured to execute any one or more of the preceding options as well as any combination of the same.

According to another embodiment, the system can include a definition component 1704 configured to enable users to tailor data signals or groups of data signals into custom metrics meaningful to a respective business. For example, the definition component or subsystem is configured to enable managers and decision makers to manually group together signals in the user interface into formations and containers customized to a respective business. For example, data signals cane be grouped together to reflect information on "Q3 2019 Release" or "New Direct-to-Consumer Functionality" or "Features requested by ExxonMobil." The system then provides analysis and reporting on those groupings of data signals. In further embodiments, the system is configured to automatically form such groupings—linking for example, JIRA ticket specifying Q3 2019 release work items into groups of data signals and respective allocations.

The automatically generated groups can enables display and display functionality in the user interface.

According to some embodiments, definitions on the system can be generated in a number of ways:
- Via explicit means in an external system, such as by using a special "Customer" field on issues in Jira (e.g., analyze data signals for target fields and groups data based on selected/identified target fields);
- Via explicit means inside the allocation system, such as by identifying a release construct (e.g., code project, software module, unit of development, etc.) and explicitly specifying a collection of Jira Epics or Issue Groupings that will comprise that release (e.g., manual designation of Jira Epics to group, Issues to Group, etc., and/or machine learning groupings of Epics and/or Issues or other categorization of data object/signals); and/or
- Via machine learning, using learned patterns from companies individually or the industry at large.

Various embodiments of the system and/or definition subsystem can be configured to execute any one or more of the preceding options as well as any combination of the same.

According to another embodiment, the system can include an allocation component 1706 configured to analyze the captured data for connections within the data sources and signals to produce a work model interpolating what task or concepts each individual worked on for each day.

For example, the allocation component or subsystem can include:
- model data structures;
- The algorithms that interpret connected data and produce the internal data model; and/or
- The algorithms that interpret the internal data model and produce a data structure that lends itself to human consumption for visualizations, reports, etc.

Figure 18:
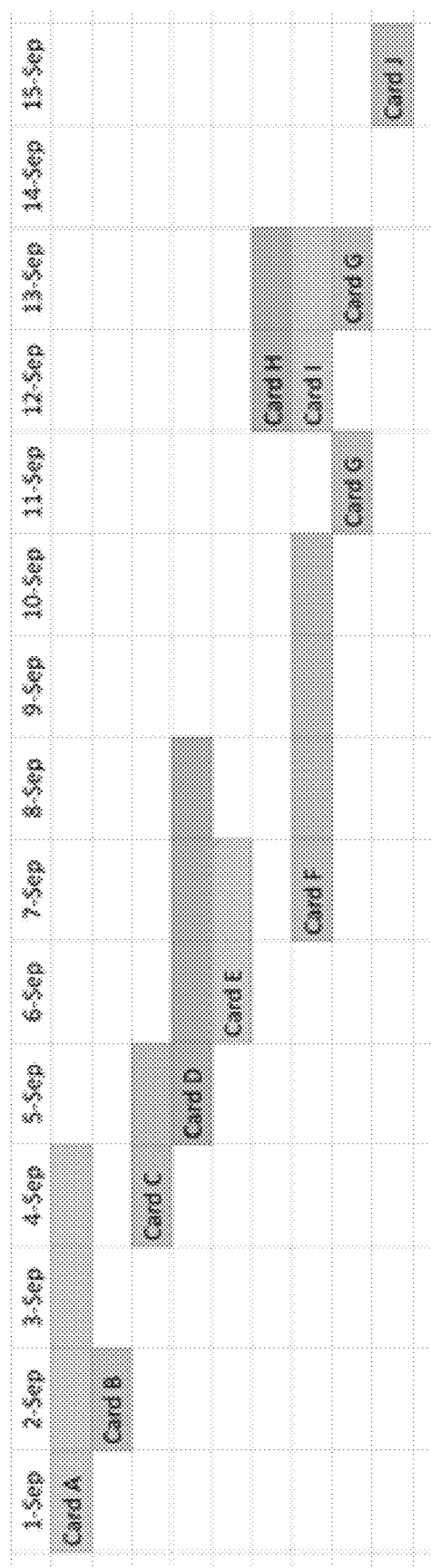
FIG. 18 is an example depiction of task assignment generated by an embodiment.

According to one embodiment, the work allocation data model structures are designed to express work done by individuals over time in ways that not only allow the system to identify which work was done by whom on which day, but also to prioritize and filter in situations where the external systems report many concurrent tasks for one individual on a particular day. For example—in the depiction of task assignment from an external system shown in FIG. 18, an individual had nine assigned, active cards (A-H) over the course of 15 days. Various embodiments of the system consider not only the concurrency of these tasks, but also probabilities based on observed engineer working tendencies, for example:
- The start and end of a task are more significant signal events than the middle
- The longer a task is "stuck" in a particular state, the more probable it is that that task is not being actively worked on
- In tasks where no source code is ever linked, it is probable that less active time was spent than other concurrent tasks where source code was linked
- Tasks where active comments/discussions are being made, descriptions are being modified, files are being attached, etc. are more likely active In further embodiments, the system's work allocation data structures allow the system to provide a version of the complete, raw data from external systems that has been filtered and processed using considerations like the examples above. For example, the filtered and processed data is also transformed by the system into secondary data structures that lend themselves to high performance queries.

Various embodiments of the system and/or allocation subsystem can be configured to execute any one or more of the preceding options as well as any combination of the same.

According to another embodiment, the system can include a projection component 1708 configured to update and/or expand the models of connected systems and the work model up so that is reflective of the present time. With a view of present state, the projection component is further configured to extrapolate a future state of work and progress to project time, cost, feature completion, etc.

Various embodiments of the projection component or subsystem are configured to accept user input and generate constrained or targeted projections responsive to user filters or targets.

According to another embodiment, the system can include a summarization component 1710 or subsystem configured to analyze internal data models and projections and generate visualizations for user consumption. For example, the summarization component can be configured to present summary or aggregate visuals through tables, displays, dashboards, automated data exports, etc.

Example System

Figure 1A:
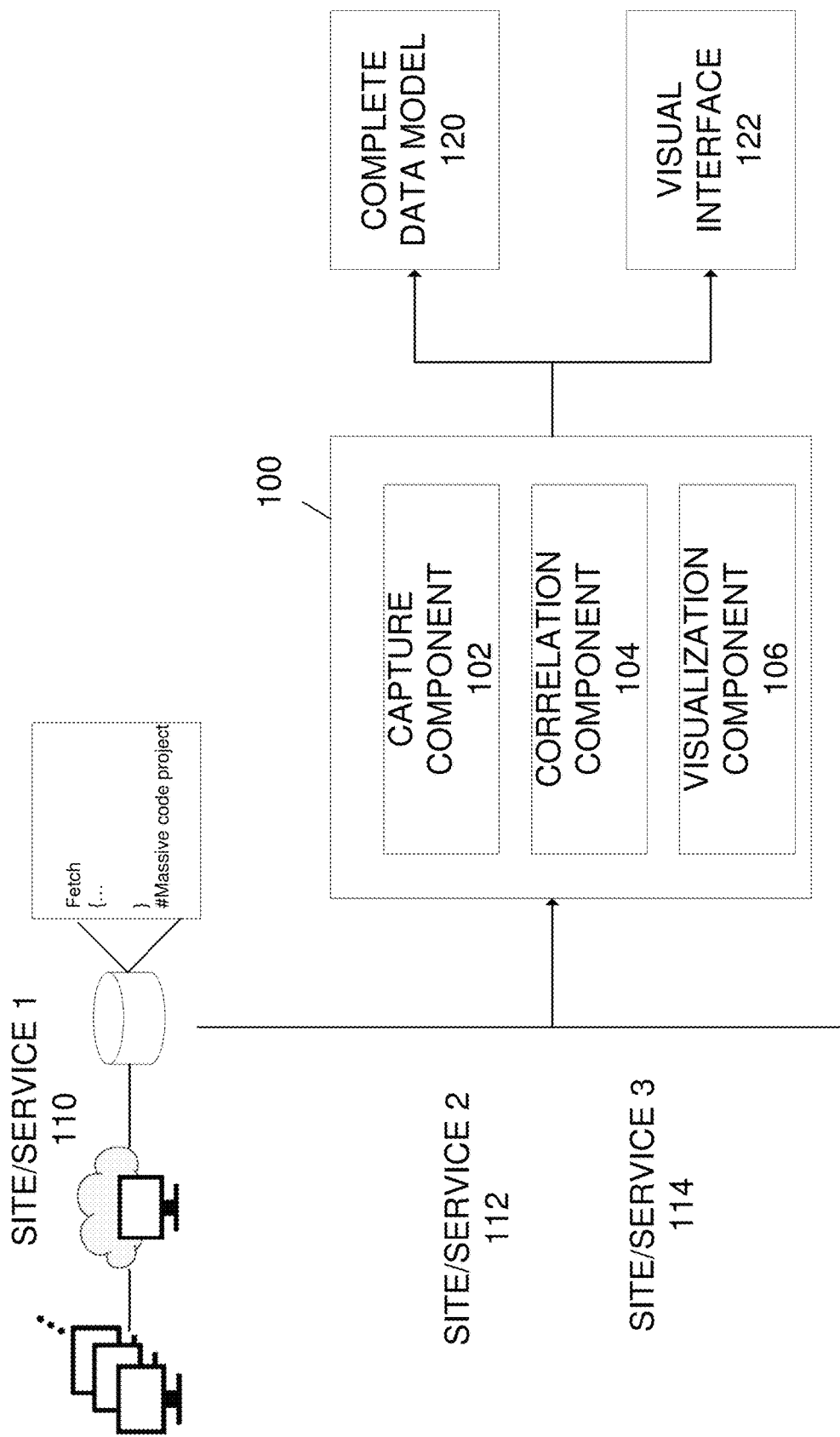
FIG. 1A is a block diagram of an example system for optimizing automated modelling of resource allocation, according to one embodiment.

FIG. 1A is a block diagram showing an example system 100 for optimizing automated modeling of resource allocation. System 100 can include a plurality of components that perform system operations collectively or separately. According to one embodiment, system 100 includes a capture component 102 configured to receive or retrieve operational information associated with a plurality of users. In one example, the operational information describes tasks executed by software engineers on development or support tasks.

In another example, the operational information includes information on software version control services, software development platforms, ticket tracking and resolution services, among other options. In some embodiments, the operational information provides information on specific tasks executed by software engineers or other operators. In various embodiments, the system is configured to capture task-based information available on different platforms and translate that task-based information into time periods of work associated with respective users. According to one example, the system can include a correlation component 104 configured to allocate at least a first portion of time to a first task associated with the first user based on analysis of received or retrieve operational information. In various embodiments the system and/or the correlation component 104 is configured to assign a plurality of time portions to a plurality of tasks associated with respective users (for example, engineers and or those supporting software engineering production (design, product folks, etc.) where the users represent the workforce allowing the system to model the costs for production, development, etc. for any organization).

According to one embodiment, the system and/or the correlation component 104 can include an adjustment component (not shown). The adjustment component can be configured to dynamically modify time periods generated by the correlation component. According to one example, the adjustment component dynamically modifies generated time portions responsive to receiving additional operation information. In one example the system receives operational information over time and the correlation and adjustment components are configured to recalculate determined time portions. In further embodiments, the correlation component 104 can be configured to execute various ones, various combinations, and/or all of the analysis kernels discussed in detail below.

In some embodiments, the system 100 can be connected to a plurality of sites or services that support software development or software support. In some examples, the system 100 can be connected to a first sight or service 110 that includes software version control functions. Code development executed at 110 can be associated to specific users in specific tasks. In one example, the capture component 102 is configured to connect to site or service 110 and retrieve or receive information on executed tasks completed by respective users. The capture component 102 can pass this operational information to the correlation component 104 and generate time periods associated with the completed task.

According to other embodiments, the capture component 102 can connect to multiple sites and/or services, including for example, site/service number two at 112, site/service three 114, among other options illustrated by three dots. In some examples, the site/service includes the known GITHUB, JIRA, among other options. One example, the capture component 102 includes a plurality of application programming interfaces APIs that connect to respective site/service for capturing operational information. Once the system generates time periods for respective tasks, the system can provide a complete and useable data set on time spent for tasks by respective users/engineers. The system translates task execution associated with respective users into periods for those users.

According to another embodiment, the system can include a visualization component 106. The visualization component 106 is configured to manage access to the complete data set on time periods generated by the correlation component 104. The visual interface 122 provides a number of screens for accessing and translating time period information, into easily accessible user interfaces. The user interface are specially configured to organize the approximation of cost and/or time, and manage translation of the time based information into approximations of value per task or value per time period spent on work.

Figure 1B:
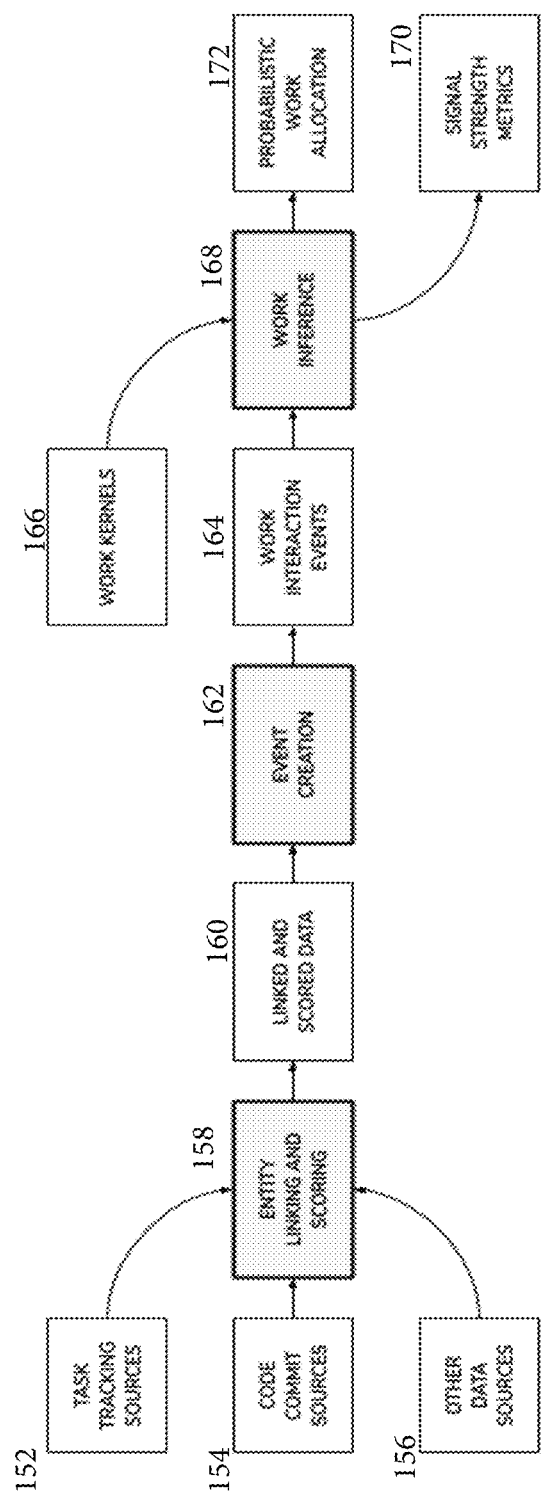
FIG. 1B is a block diagram of components and data sources, according to one embodiment.

FIG. 1B is a block diagram of one embodiment of the system and data sources used for analyzing work information. For example at 152 information on task tracking sources, information from code commit sources at 154, and information from other data sources at 156 is used in entity linking and scoring processes at 158. Linked in score data can be stored at 160 and used in event creation at 162. At 164 work interaction events are defined based on explicit information which can be used to develop work inference information at 168. According to one embodiment work kernels or used at 166 to analyze operational information (e.g. information specifying details around potential work events) and develop work inference information out 168. The analysis performed can include analysis of signal strength metrics at 170 (e.g., corroborated data sources or corroborated influenced information can be weighted higher and evaluated as part of signal strength metrics). At 172 a probabilistic work at location is generated automatically specifying from an incomplete data set a complete (probabilistic) allocation of time spent on a specific work task for one or more specific work tasks.

Figure 2:
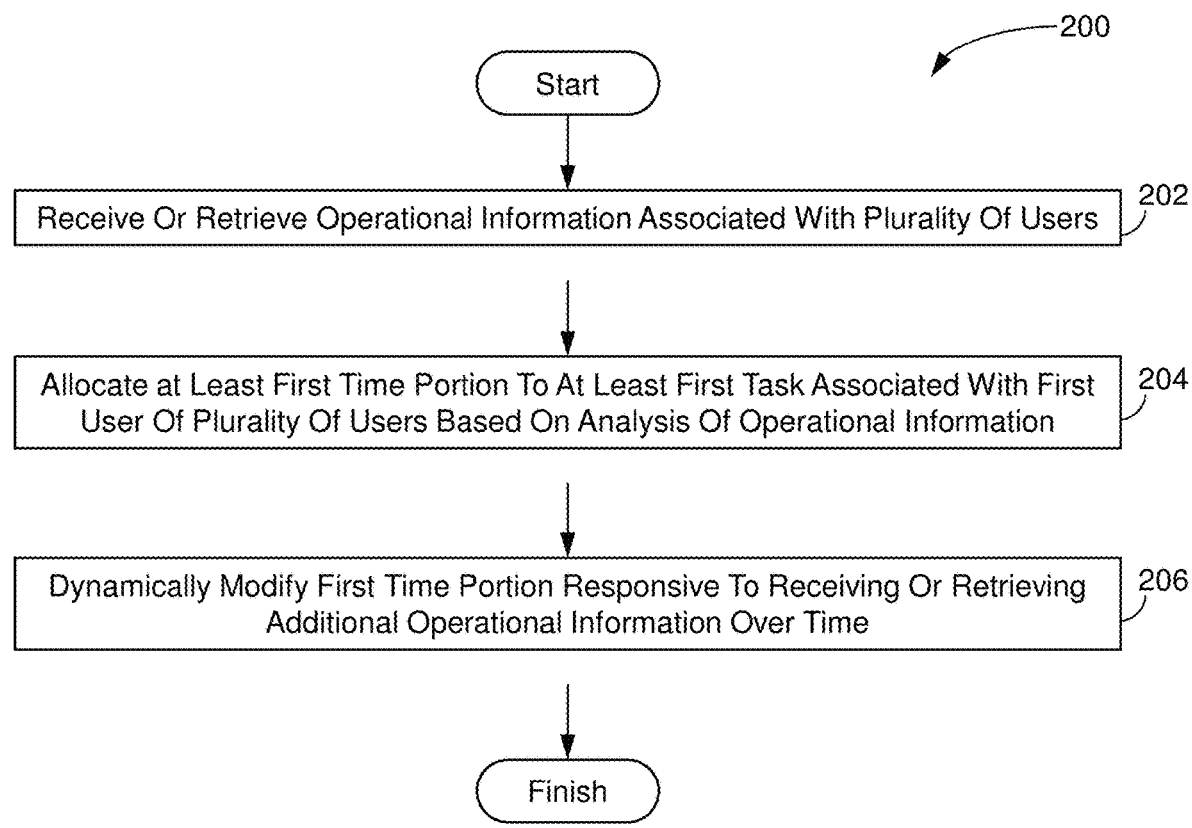
FIG. 2 is an example process for optimizing automated modelling of resource allocation, according to one embodiment.

FIG. 2 is an example process 200 for optimizing automated resource allocations. The process begins at 202 with receiving or retrieving operational information associated with a plurality of users. Operational information can include any digital signal that a system can capture that is associated with time spent performing a task. For example, operational information can include a ticket item on the known JIRA system. The information on JIRA includes an operator assignment, information on a problem (e.g., ticket), and any resolutions of the problem. As part of the ticket time information is available (e.g., date opened, date of status change, date closed, etc.). Step 202 may be performed by one or more hardware processors configured by machine-readable instructions including a module that is the same as or similar to computer system receiving module 108, in accordance with one or more implementations.

Process 200 continues at 204 with allocating at least a first time portion to at least a first task associated with a first user of the plurality of users based on analysis of the operational information. Typically, process 200 and step 204 includes the allocation of a multitude of time periods to a variety of task information captured from a plurality of data sources (e.g., JIRA, GITHUB, etc.). At a basic level step 204 described a first operation of allocation that is performed repetitively or continuously as more operational information is received, allowing the execution to refine allocated time periods, adjust allocations, modify allocations, delete allocation over time, among other examples.

Step 204 may be performed by one or more hardware processors configured by machine-readable instructions including a module that is the same as or similar to Allocation module 110, in accordance with one or more implementations.

Process 200 continues with dynamically modifying the first time portion responsive to receiving or retrieving additional operational information over time at 206. As discussed, step 204 can be executed repetitively or even continuously as more data is received or retrieved. In further embodiments, steps 204 or 206 can include analysis of the operational information to identify dependencies between allocated time periods, such that if one time period in a group of dependent time periods is modified, the modification can trigger adjustments or further analysis across the entire dependent group.

Operation 206 may be performed by one or more hardware processors configured by machine-readable instructions including a module that is the same as or similar to time portion modification module 112, in accordance with one or more implementations.

Additional System Examples

Figure 3:
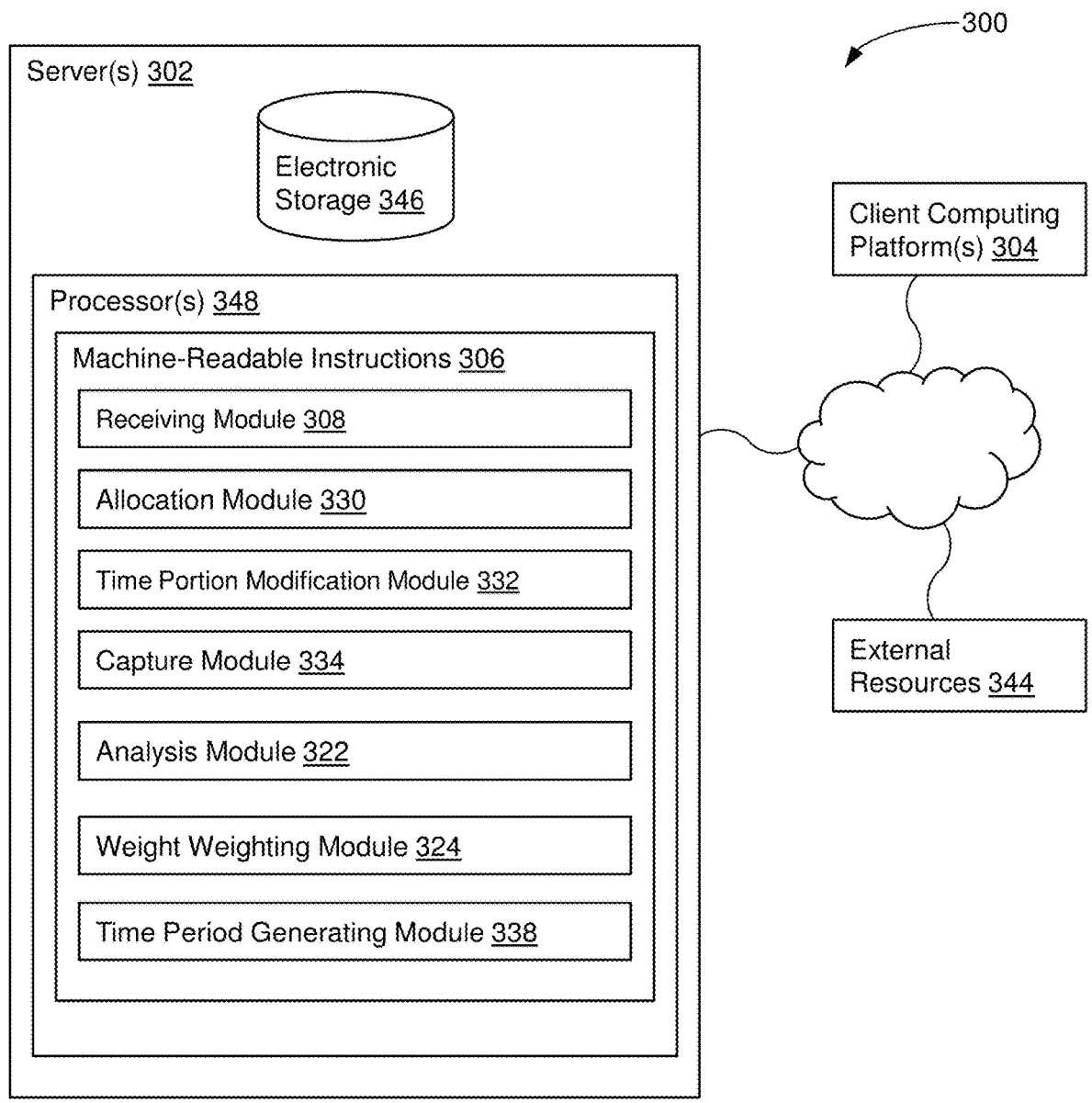
FIG. 3 is a block diagram of an example system for optimizing automated modelling of resource allocation, according to one embodiment.

FIG. 3 illustrates a system 300 configured for optimizing automated modelling of resource allocation, in accordance with one or more implementations. In some implementations, system 300 may include one or more servers 302. Server(s) 302 may be configured to communicate with one or more client computing platforms 304 according to a client/server architecture and/or other architectures. Client computing platform(s) 304 may be configured to communicate with other client computing platforms via server(s) 302 and/or according to a peer-to-peer architecture and/or other architectures. Users may access system 300 via client computing platform(s) 304. According to one embodiment, server(s) 302 may be configured by machine-readable instructions 306. Machine-readable instructions 306 may include one or more instruction modules. The instruction modules may include computer program modules. The instruction modules may include one or more of a computer system receiving module 308, an Allocation module 330, a time portion modification module 332, a capture module 334, 33 an API managing module 338, an information execution module 320, an information managing module 322, a weight weighting module 324, a weight adjusting module 326, a time portion adjusting module 328, a set re-determining module 330, an information determination module 332, an association adjusting module 334, an element generating module 336, a time period generating module 338, a time period assignment module 340, a time period identifying module 342, and/or other instruction modules.

Receiving module 308 may be configured to receive or retrieve, by a computer system, operational information associated with a plurality of users. In some examples, allocating may include associating, by the computer system, a plurality of users identities across a plurality of information sources to respective users and respective task based information. The act of allocating may include allocating, by the computer system, a plurality of time portions to a respective first user based on analysis of operational information captured across the plurality of data sources. Act of dynamically modifying may include dynamically adjusting, by the computer system, the plurality of time portions and a plurality of tasks allocated to the respective user. By way of non-limiting example, dynamically adjusting may include acts of reducing, adding, or eliminating time portions and/or tasks, by the computer system, responsive to processing, by the computer system, additional operational information or additional data sources of operational information.

The act of allocating may also include applying, by the computer system, a classification matrix to operational data received from a first data source. The act of allocating may include automatically classifying, by the computer system, operational data received from a plurality of data sources. The act of allocating may include determining, by the computer system, a candidate time period or range of candidate time periods responsive to the automatic classification of the operational data. The act of allocation may include executing of at least a first stage for classification and determination of the candidate time period or candidate range of time periods and execution of at least a subsequent stage for determination of a final allocation of at least the first time portion to at least the first task associated with a first user. In another example, allocating can include executing various ones, various combinations, and/or all of the analysis kernels discussed below.

Allocation module 330 may be configured to allocate, by the computer system, at least a first time portion to at least a first task associated with a first user of the plurality of users based on analysis of the operational information. The act of re-determining of the first time portion may include re-determining, by the computer system, of time periods assigned to a set of dependent time periods. The correlations component may be further configured to establish a relative time period for at least a first user based at least in part on a time period assigned to another task of the first user.

Time portion modification module 332 may be configured to dynamically modify, by the computer system, the first time portion responsive to receiving or retrieving additional operational information over time. Capture module 334 may be configured to execute at least a first application programming interface. Capture module 334 may be configured to manage, by the first API, receipt or retrieval of the operational information from a software version control subsystem. Capture module 334 may be configured to execute a second API. Capture module 334 may be configured to execute a plurality of APIs. Capture module 334 may be configured to manage, by the second API, receipt or retrieval of the operational information from a software ticketing system.

Capture module 334 may be configured to manage, by the plurality of APIs, receipt or retrieval of the operational information from a plurality of respective data sources including at least software version control subsystems, software ticketing subsystems, time tracking subsystems code repository subsystems, software development/messaging subsystems and project management subsystems, among other options.

Analysis module 322 may be configured to dynamically weight, by the computer system, operational information being analyzed responsive to corroboration of two or more data sources. Weighting module 324 may be configured to dynamically adjust, by the computer system, weights associated with operational information responsive to corroboration of a first data source. The act of allocating may include assigning, by the computer system, a time period range including a weighted minimum or weighted maximum time period associated with a classification of a type of task associated with the first data source.

Weighting module 324 can include an adjusting module 334 (or may perform the same functions) which may be configured to dynamically adjust the weights associated with operational information to corroboration of a second data source. Weighting module 324 may be configured to re-determine, by the computer system, the first time portion for at least the first task associated with the first user of the plurality of users responsive to adjusted weights.

Analysis module 322 may be configured to determine, by the computer system, a set of dependent time periods associated with the operational information. Analysis module 322 may be configured to dynamically adjust weights to operational information responsive to identifying correlations between at least two or more of the data sources. Analysis module 322 may be configured to generate, by the computer system, associations between the operational information and inferred time periods required to accomplish the work. Analysis module 323 may be configured to automatically generate, by the computer system, dependencies between elements of the operational information and overlapping or adjacent time periods.

Allocation module 330 can include a time period generating module 338 (or may perform the same functions) which may be configured to assign, by the computer system, a plurality of time periods to groupings of operational information based at least in part on the dependencies between the elements of operational information. In some examples, the act of allocating time periods may include allocating, by the computer system, a second time portion to a second task associated with a first user of the plurality of users based on analysis of the operational information. In some examples, the act of allocating time periods may include allocating, by the computer system, a third time portion to a third task associated with a first user of the plurality of users based on analysis of the operational information.

Allocation module 330 can include a time period generating module 338 (or may perform the same operations) which may be configured to identify, by the computer system, time periods having no associated signal. Time period generating module 338 may be configured to preferentially re-determine, by the computer system, allocation of a plurality of time periods to time periods having no associated signal. Time period generating module 338 may be configured to preferentially assign, by the computer system, inferred time periods associated with respective users to time periods having no associated signal (e.g., no explicit data).

In some implementations, server(s) 302, client computing platform(s) 304, and/or external resources 344 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 302, client computing platform(s) 304, and/or external resources 344 may be operatively linked via some other communication media.

A given client computing platform 304 may include one or more processors configured to execute computer program modules. The computer program modules may be configured to enable an expert or user associated with the given client computing platform 304 to interface with system 300 and/or external resources 344, and/or provide other functionality attributed herein to client computing platform(s) 304. By way of non-limiting example, the given client computing platform 304 may include one or more of a desktop computer, a laptop computer, a handheld computer, a tablet computing platform, a NetBook, a Smartphone, a gaming console, and/or other computing platforms.

External resources 344 may include sources of information outside of system 300, external entities participating with system 300, and/or other resources. In some implementations, some or all of the functionality attributed herein to external resources 344 may be provided by resources included in system 300.

Server(s) 302 may include electronic storage 346, one or more processors 348, and/or other components. Server(s) 302 may include communication lines, or ports to enable the exchange of information with a network and/or other computing platforms. Illustration of server(s) 302 in FIG. 3 is not intended to be limiting. Server(s) 302 may include a plurality of hardware, software, and/or firmware components operating together to provide the functionality attributed herein to server(s) 302. For example, server(s) 302 may be implemented by a cloud of computing platforms operating together as server(s) 302.

Electronic storage 346 may comprise non-transitory storage media that electronically stores information. The electronic storage media of electronic storage 346 may include one or both of system storage that is provided integrally (i.e., substantially non-removable) with server(s) 302 and/or removable storage that is removably connectable to server(s) 302 via, for example, a port (e.g., a USB port, a firewire port, etc.) or a drive (e.g., a disk drive, etc.). Electronic storage 346 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 346 may include one or more virtual storage resources (e.g., cloud storage, a virtual private network, and/or other virtual storage resources). Electronic storage 346 may store software algorithms, information determined by processor(s) 348, information received from server(s) 302, information received from client computing platform(s) 304, and/or other information that enables server(s) 302 to function as described herein.

Processor(s) 348 may be configured to provide information processing capabilities in server(s) 302. As such, processor(s) 348 may include one or more of a digital processor, an analog processor, a digital circuit designed to process information, an analog circuit designed to process information, a state machine, and/or other mechanisms for electronically processing information. Although processor(s) 348 is shown in FIG. 3 as a single entity, this is for illustrative purposes only. In some implementations, processor(s) 348 may include a plurality of processing units. These processing units may be physically located within the same device, or processor(s) 348 may represent processing functionality of a plurality of devices operating in coordination. Processor(s) 348 may be configured to execute the described modules (e.g., 308-338), and/or other modules. Processor(s) 348 may be configured to execute modules 308-338, and/or other modules by software; hardware; firmware; some combination of software, hardware, and/or firmware; and/or other mechanisms for configuring processing capabilities on processor(s) 348. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308-338 are illustrated in FIG. 3 as being implemented within a single processing unit, in implementations in which processor(s) 348 includes multiple processing units, one or more of modules 308-338 may be implemented remotely from the other modules. The description of the functionality provided by the different modules 308-338 described below is for illustrative purposes, and is not intended to be limiting, as any of modules 308-338 may provide more or less functionality than is described. For example, one or more of modules 308-338 may be eliminated, and some or all of its functionality may be provided by other ones of modules 308-338. As another example, processor(s) 348 may be configured to execute one or more additional modules that may perform some or all of the functionality attributed to any one or any combination of modules 308-338.

Example System Implementation and/or Optimization

According to one embodiment, the system (e.g., a probabilistic work allocation system) takes as input a series of observed "work interactions" produced by a person, and provides as output a probability distribution over a set of tasks for a series of time intervals for that person (e.g., referred to as a "probabilistic work allocation"). In further embodiments, the system also includes a feedback loop by which validated work allocations can be submitted and used to optimize the parameters of the work allocation system (e.g., updating the work allocation model to refine analysis). Based on the analysis and functions described various embodiments of the system improve over various known approaches by enabling the handling of incomplete data and extrapolation into a complete model, improving the accuracy and completeness of such modelling, and reducing computations required to generate the model.

According to one embodiment, example inputs to the system are:
  work interaction events: a set of events (e.g., represented as either points in time or intervals) generated by a person at specified times that are related to one or more tasks. For example, "Person A committed code related to Task B at 12:00:00 PM on Jan. 1, 2018.";
  event and link scores: a set of scores that describe the level of confidence the system has in a particular event or in the link between and entity and a task. For example, "Code commit C has a confidence level of 50%, and is linked to Task B with a confidence of 75%.";

time intervals: a set of time intervals over which one would like to generate work allocations (e.g. all 1-hour increments during the month of January 2018); and task set: a set of tasks which a given person could be working on during the time intervals specified. In some examples, tasks may be of varying categories (e.g. "primary tasks", "secondary tasks"). Also, they may be linked to known tasks of record or they may be "unlinked" (i.e. the specific nature of the task is unknown).

According to another embodiments, example outputs of the system are:

probabilistic work allocation: a series of probability distributions over the task set, for each time interval specified. For example, the work allocation represents the probability that the person was working on a given task during a particular time interval; and signal strength metrics: scalar measure of the amount of observable work interaction, both per unit time (e.g. signal strength per hour) and in aggregate for a given person. In some examples, signal strength may also be broken down into components based on data source (e.g. "60% of the signal is from task tracking sources, 40% is from code commit sources").

According to various embodiments, the system can include a set of parametric functions that when executed map observed work interactions (e.g., code commit by user, event resolution by user, etc.) to approximations of actual work performed. For example, the system can include a set of "work kernels"—a set of parametric functions that define the relationship between actual work on tasks in the task set and the observed work interactions (such as a code commit or a resolution event in issue-tracking software).

According to various embodiments, the following rules and allocations are implemented. For example, the notation correspond to a particular person for whom work allocations are to be computed and implicit in various embodiments is the concept that only one task can actually be worked on by a given person during a given time interval. For example, later specific information sources creating a conflict (e.g., two tasks done at the same time, can be resolve by using the more reliable data source or sources (e.g., inferred data trump by actual data points, corroborated (e.g., multiple agreeing data sources over uncorroborated, etc.).

TABLE I (Example Notation for Analysis)

| | |
|---|---|
| $i \in \{1, \ldots, M\}$ | Index for the task set (M total tasks) |
| $j \in \{1, \ldots, N\}$ | Index for the set of work interaction events (N total events) |
| $t \in \{1, \ldots, T\}$ | Index for the set of time intervals (T total intervals) |
| $y_{ij}(t) \in \{0,1\}$ | "Observed interactions"-indicator variable (0 or 1) that event interaction j relevant to task i occurred during time interval t |
| $Y(t) = \{y_{ij}(t)\}$ | Matrix (M × N) of all observed interactions for time interval t |
| $p_i(t) \in [0,1]$ | Probability that person worked on task i during time interval t |
| $p(t) = \{p_i(t)\}$ | Work distribution-probability distribution over the task set for a time interval t |

Example Linking and Scoring Execution

According to some embodiments, the system can execute preprocessing step(s) as part of modeling, generating or assigning information. For example the system can be configured to perform entity linking and scoring. According to various embodiments, "linking" refers to the process of identifying relationships between elements of the various data inputs. For example, the probabilistic work allocation system can use any one or more or any combination of the following types of links:

Links between user accounts from different services (e.g. task tracking and code commit platforms).

Links between individual tasks and various source code operations (e.g. commits, merges, pull requests).

Links between unstructured data sources (raw text from documents, calendars, wikis, or work chat) and individual tasks.

According to some embodiments, the system executes methods for establishing links that include text matching based on metadata (e.g. issue descriptions, commit messages, code branch names, etc.), manual linking, and user feedback, among other options. In further embodiments, the system is configured to evaluate the established links and the associated data, resulting in two types of scores: entity scores and link scores.

Entity Scoring Examples

According to various embodiments, an entity score is a measure of confidence that a certain item of work evidence (e.g. issue, commit, etc.) represents a significant work effort and is to be included in the work model. For example, entity scores are generated by the system based on a selection of factors, which can vary by data type. Various embodiments of the system are configured to analyzed one or more or any combination of the following entity scoring factors (Table 2).

TABLE II

Entity scoring features

| Entity | Features |
|---|---|
| Code commit | Statistics derived from the commit message (character and word count, keyword frequency, etc.) |
| | Statistics derived from the total set of all issues that have been linked to this entity (count, authors, labels, etc.) |
| Code merges | The names and attributes of the branches of code being merged |
| | Statistics derived from the total set of all issues that have been linked to this entity (count, authors, labels, etc.) |
| Code reviews | The review responses from users (approved, rejected, etc.) |
| | Statistics about the full set of authors that have make commits contained in the code being reviewed |
| | Statistics (count, length, keywords, etc.) from user comments made during the review |
| | Statistics derived from the total set of all issues that have been linked to this entity (count, authors, labels, etc.) |

Example Link Scoring

According to one embodiment, a link score is a measure of confidence that a relationship between two entities (such as a task and a code commit) is valid (e.g. the link is not due to user error) Like entity scores, various system embodiments are configured to generate link scores based on a selection of factors, which can vary by data type. For example, the system is configure to use any one or more or any combination of the link scoring factors (Table 3).

TABLE III

Link scoring features

| Entity | Features |
| --- | --- |
| Task/code commit link | Similarity between the history of assignees for the task and the authors of the code<br>Proximity in time of actions taken on the issue and the time of the commit<br>Similarity between text fields in the task metadata (title, description, labels, etc.) and text fields in the commit metadata (commit message, branch name, etc.) |
| Task/code merge link | Similarity between the history of assignees for the task and the authors of the code<br>Proximity in time of actions taken on the issue and the time of the merge<br>Similarity between text fields in the task metadata (title, description, labels, etc.) and text fields in the code merge metadata (branch name, etc.) |
| Task/code review link | Similarity between the history of assignees for the task and the authors of the code<br>Proximity in time of actions taken on the issue and the time of the review<br>Similarity between text fields in the task metadata (title, description, labels, etc.) and text fields in the code review metadata (title, description, labels, branch name, etc.) |

According to some embodiments, the system is configured to process a mixture-model-based probabilistic analysis of work data points to derive work allocations. According to some implementations, the work distribution for each time interval is modeled directly as a mixture of weighted work kernel functions. For example, the work probabilities can be expressed as $$p_i(t) = \frac{1}{z(t)} \sum_{j=1}^{M} w_{ij} f[t \mid y_{ij}(t), \theta_{ij}]$$

where f denotes a parametric work kernel and z is a normalization constant defined such that $$\sum_{j=1}^{M} p_i(t) = 1$$

The variables $w_{ij}$ and $\theta_{ij}$ denotes a scalar weighting and set of parameters for the work kernel (respectively), which may depend on characteristics of the task, the interaction event, or the person for whom the work allocation is being computed.

According to one embodiment, given the set of work kernels, kernel parameters, and weightings, the mixture-model-based probabilistic work allocation system computes the work distribution as follows:
  Evaluate the work kernels for all tasks, interaction events, and time intervals.
  Aggregate the work kernels according to the corresponding weights.
  Normalize the work distribution for all time steps.

According to other embodiments, the system can be configured to execute likelihood-based probabilistic work allocation functions. In such embodiments, the system is configured to compute the work distribution within a Bayesian framework as a posterior probability (e.g., under the assumption of statistical independence between the interaction events). In this example, the work probabilities can be computed by the system as a product of event likelihoods:

$$p_i(t) = \frac{1}{z(t)} \prod_{j=1}^{M} f[t \mid y_{ij}(t), \theta_{ij}] \pi_i(t)$$

where the kernel f now corresponds to a likelihood function that describes the probability of the observed interaction $y_{ij}(t)$ given the "true" work allocation, and $\pi_i(t)$ denotes a prior probability distribution over tasks for each time interval t. As with the mixture model example (above), $\theta_{ij}$ denotes a set of parameters for the work kernel that can depend on characteristics of the task, the interaction event, or the person for whom the work allocation is being computed.

According to one embodiment, given the set of work kernels, kernel parameters, and weightings, the likelihood-based probabilistic work allocation system computes the work distribution as follows:
  Evaluate the likelihood functions for all tasks, interaction events, and time intervals.
  Aggregate the likelihoods, weighting them according to the prior distributions.
  Normalize the work distribution for all time steps.

Example Signal Strength Metrics

In addition to the work model allocations, both the mixture-model-based and likelihood based functions provide for measures of "signal strength." Various embodiments of the system may evaluate work data based at least in part on one or the other or both models.

In the examples above, the normalization constant z(t) is an indicator of the total weight of evidence that work on any task in the task set occurred during a given time interval t. As such, the normalization constant can be used directly or can be integrated over multiple time intervals to provide signal strength over large time bins (e.g. daily signal strength instead of hourly, or weekly, etc.). According to some embodiments, by integrating z(t) for time intervals in a window for an individual, the system is configured to provide a single scalar metric of signal strength for that person for the given window. According to various embodiments, this single metric can be used to compare signal strengths across different people.

Example Work Kernels

Various embodiments, can be configured to use different work kernels and the selection of the work kernel can impact the allocations generated. For example, these functions are selected for use as components of the weighted sum in the mixture model case, or to represent likelihoods of the observed interaction events in the likelihood-based case. In various embodiments, the functional forms and parameters that define the work kernels can vary based on a variety of criteria, including, for example:
  the time interval during which the interaction occurred;
  the type of observed work interaction and characteristics of the interaction (e.g. number of lines changed in a code commit);
  the type of task and characteristics of the task (e.g. task is of type "bug fix"; task is labeled "high priority"); and
  the organization, team, or individual for whom the work is being allocated, among other options.

In further embodiments, the system can implement a Gaussian work kernel, based on a Gaussian (normal) distribution. In the Gaussian example, the kernel can be used to represent the uncertainty in work allocation around an interaction event. For example, the model can establish with high confidence that work is occurring on a task during a time interval close to or concurrent with the timing of a commit event, and with lower confidence as the difference in time increases.

According to one embodiment, the kernel function takes the parametric form:

$$f(t) = \frac{1}{\sqrt{2\pi\sigma^2}} \exp\left[-\frac{(t-\mu)^2}{2\sigma^2}\right]$$

where the parameters $\mu$ and $\sigma$ may depend on characteristics of the task, the interaction event, and/or the person for whom the work allocation is being computed.

Exponential Work Kernel Example

The system can also be configured to use a number of other kernels to derive or optimize the allocation of time to users' work. For example, the system can include an exponential work kernel based on an exponential distribution. In one embodiment, the exponential work kernel can be executed to represent one-sided work interactions, such as an event indicating that work on an issue has been initiated for the first time (in which case the model is configured to handle the expectation that works occurs on and for a time after the start time of the event (and, for example, not before).

According to one example, the kernel function takes the parametric form:

$$f(t) = \begin{cases} \frac{1}{\mu}\exp\left(-\frac{t}{\mu}\right) & t \geq 0 \\ 0 & x < 0 \end{cases}$$

where the parameter $\mu$ may depend on characteristics of the task, the interaction event, and/or the person for whom the work allocation is being computed.

Semi Parametric (Piecewise-Constant) Kernel Example

According to another embodiment, the system can include a semi-parametric kernel. The semi-parametric kernel represents an approximation of any arbitrary kernel function as a piecewise-constant function over a set of n partitions of the time intervals. The kernel function takes the parametric form:

In one example, the kernel function takes the parametric form:

$$f(t) = \begin{cases} \pi_1 & t < t_1 \\ \pi_2 & t_1 \leq t < t_2 \\ \vdots & \vdots \\ \pi_{n-1} & t_{n-2} \leq t_{n-1} \\ \pi_n & t > t_{n-1} \end{cases}$$

where the constants $\pi_1, \ldots, \pi_n$ and bin thresholds $t_1, \ldots, t_{n-1}$ may depend on characteristics of the task, the interaction event, and/or the person for whom the work allocation is being computed.

Time-Delayed Kernel Example

According to another embodiment, any defined kernel function can be adjusted with a time delay, to represent a time-shifting of the work allocation based on the observed work interaction:

$$f(t) = f'(t - t_0)$$

Time-Inverted Kernel Example

According to another embodiment, a defined kernel function that is asymmetric in time can be time-inverted to create a new kernel (e.g. one can convert a right-tailed exponential to a left-tailed one):

$$f(t) = f'(t_0 - t)$$

Interval Kernel Example

According to another embodiment, in the case where a work interaction event is an interval (instead of a point event), then an interval kernel can be invoked by the system. According to one embodiment, the basic form of an interval kernel is a constant during the interval, and zero outside the interval:

$$f(t) = \begin{cases} \alpha & t_{start} \leq t \leq t_{end} \\ 0 & \text{otherwise} \end{cases}$$

In another embodiment, a "tapered interval kernel" can be invoked by the system to provide a gradual transition between the constant region and the region outside the interval. Let g(t) be a "tapering function" that has a value of $g(0)=\alpha$ and tends toward 0 as t increases. For example, a tapered interval kernel takes the form:

$$f(t) = \begin{cases} g(t_{start} - t) & t < t_{start} \\ \alpha & t_{start} \leq t \leq t_{end} \\ g(t - t_{end}) & t > t_{end} \end{cases}$$

Work Allocation Optimization Example

According to various embodiments, the system can include a feedback loop and optimization components. In some examples, these component enable a user to provide "validated" work allocations as input and use these validated data points to optimize the tunable parameters of the system.

According to some embodiments, sources of validated work allocations include:

- interaction events of people that have been hand-identified as being "highly documented" (i.e. they generate a large number of work interaction events that are highly representative of their "true work")
- work logs of people that are required by their organization to perform an external validation of their work (e.g. contractors that are required to keep detailed time sheets);
- point observations derived from direct feedback from workers via an interactive application (e.g. data from a chatbot that occasionally asks people what they are working on at the moment);

synthetic workflows and interaction events from a computer simulation of work activity; and pseudo-data generated via random perturbations of validated data from any of the aforementioned sources.

According to some examples, given validated work data, the system determines optimal parameters for kernel selection, kernel parameters, weighting functions, and/or prior probability distributions, by selecting values that minimize the error between the work allocation output and the "true" work allocation as indicated by the validated data.

Example Process Flow Refinements

FIGS. 4-16 illustrate example modifications to process steps discussed above or additional detailed process steps that may be executed in conjunction, or as alternatives to, or in addition to process steps discussed above (e.g., with respect to FIG. 2).

Figure 4:
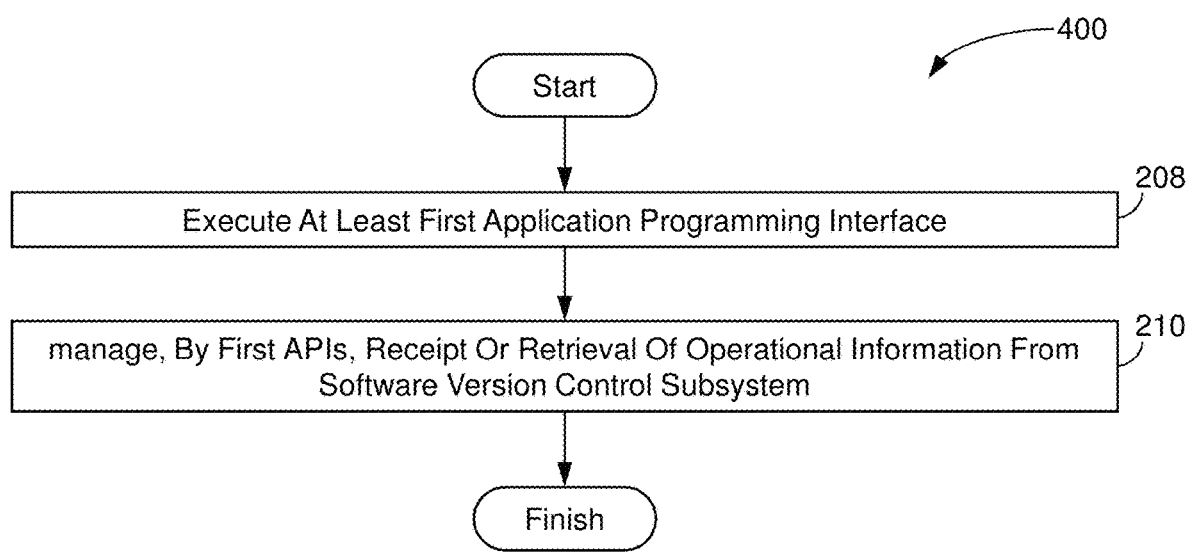
FIGS. 4-16 are example process steps that can executed as sub-processes or in conjunction with, as alternatives to, or in addition to process steps described herein, according to various embodiments.

FIG. 4 shows an example process 400 for managing information retrieval from external systems. Process 400 can begin at 208 with instantiation of at least a first application programming interface ("API"). In various embodiments, process 400 can invoke any number of APIs, each configured for access to a specific or generic groups of external systems. For example, the APIs are configured to manage data capture of work information. In one example, process 400 continues at 210 with capture of work information from various external systems. Based on capture of external work information, the system can infer how much time has been spent on a given task by a given party. Additionally, the system can use learning models on the captured data points to build a complete data set from minimal or incomplete data retrieved. In further example the information from external systems can be used to improve a confidence evaluation of inferred or created data.

Figure 5:
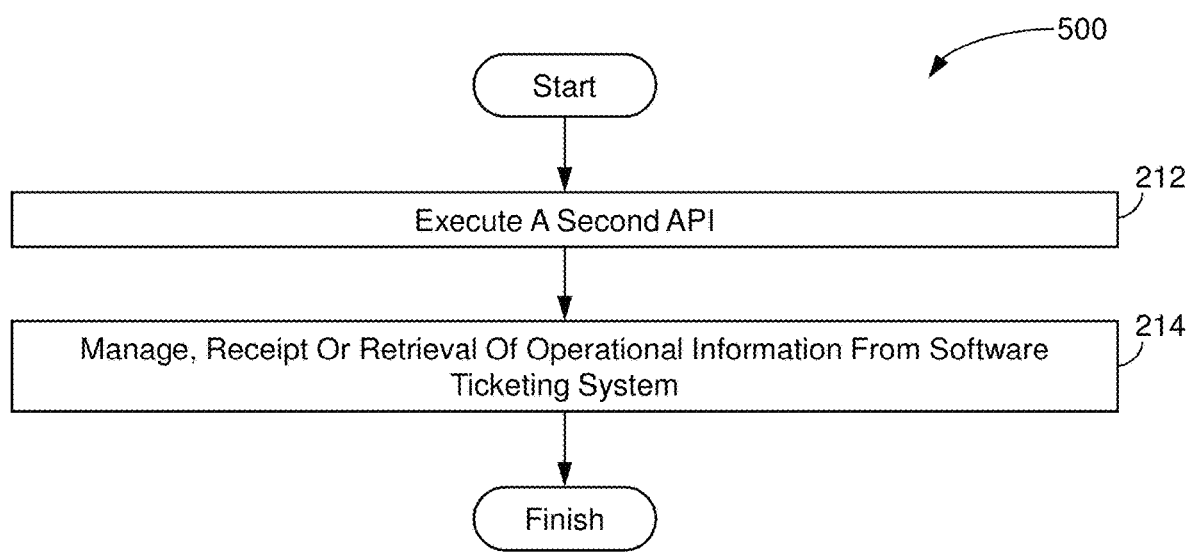

FIG. 5 shows an example process 500 and steps that can be used in conjunction with process 400 or 200 or other process steps discussed herein. In other examples, process 500 can be used to modify other processes or to be executed in addition. According to another embodiment, process 500 can begin at 212 with instantiation of a second API. At 214 process 500 can continue with receipt or retrieval of operational information, for example, from a software ticketing system.

Figure 6:
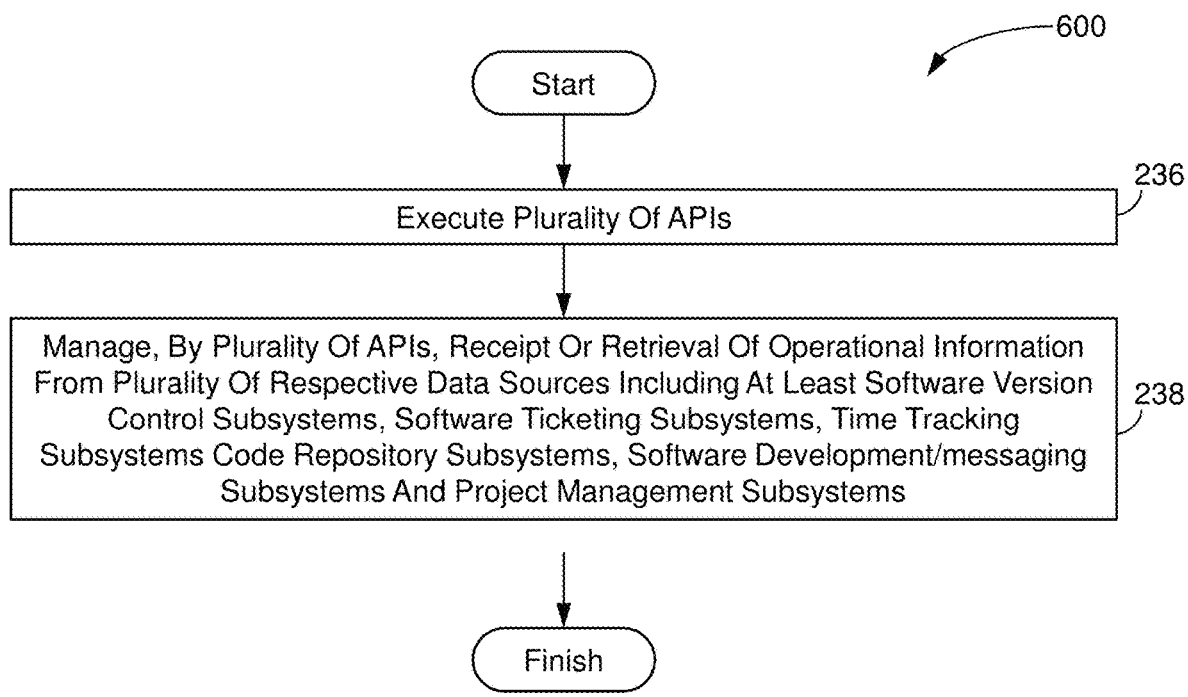

FIG. 6 illustrates other examples of steps that can be used in conjunction with prior processes and/or steps. According to one embodiment, process 600 can begin with execution of a plurality of APIs at 236. The plurality of APIs can be used to retrieve information from various external systems including for example, software version control systems, software ticketing systems, time tracking systems, code repository systems, software development systems, and/or project management systems.

Figure 7:
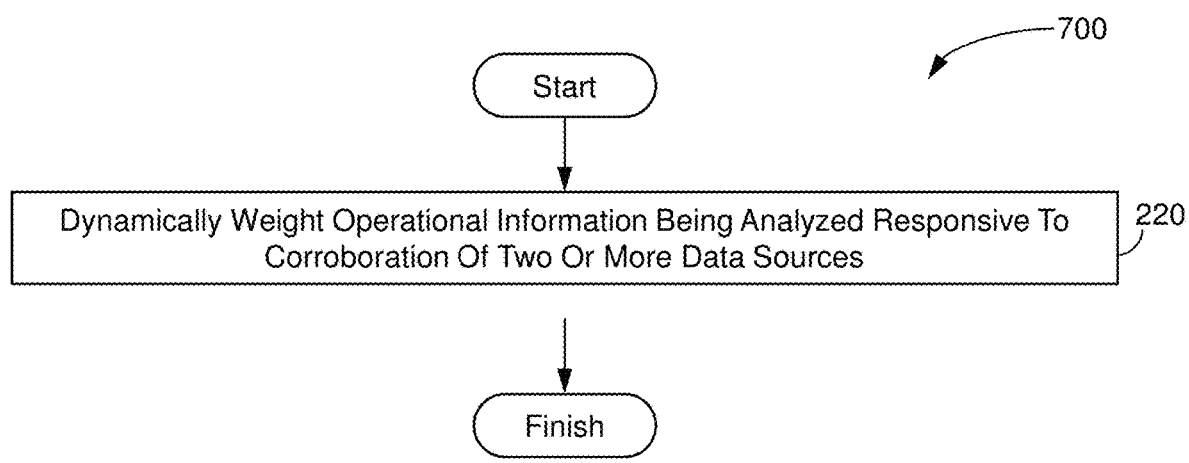

Once data is retrieved, for example, from external systems the system can execute a variety of steps to analyze the received data. FIG. 7 illustrates one example of such analysis. In FIG. 7 shown is process 700 for analyzing received information. Process 700 can begin at 220 with dynamic waiting of retrieved information (e.g., operational information, code revision information, ticketing information, development information, project management information, etc.).

Figure 8:
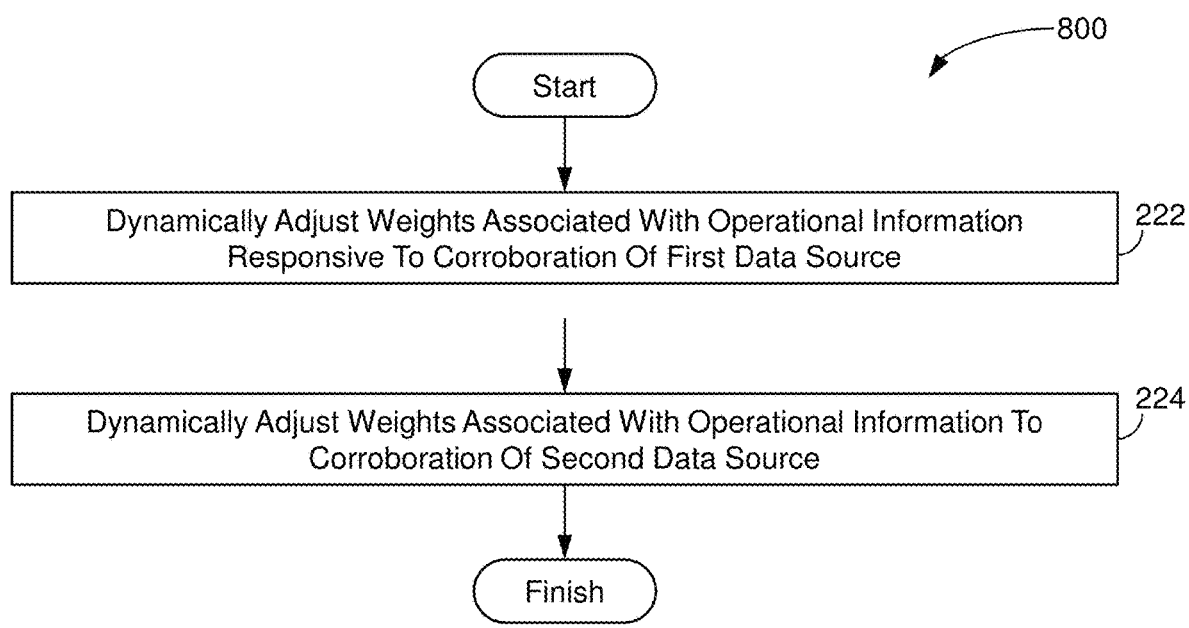

FIG. 8 illustrates another example of analysis steps that may be used in conjunction with other processes or instead of steps in other processes. For example process 800 can be executed to adjust weights associated with received information. According to one embodiment, process 800 can begin at 222 with dynamically adjusting weights associated with received information (e.g., operational information, work information, etc.). In one example process 800 can continue at 224 with dynamic adjustment of weights associated with received information responsive to corroboration of a second data source. In various embodiments, corroboration of independent information sources increases the confidence level of the received information and/or inferences generated from multiple sources.

Figure 9:
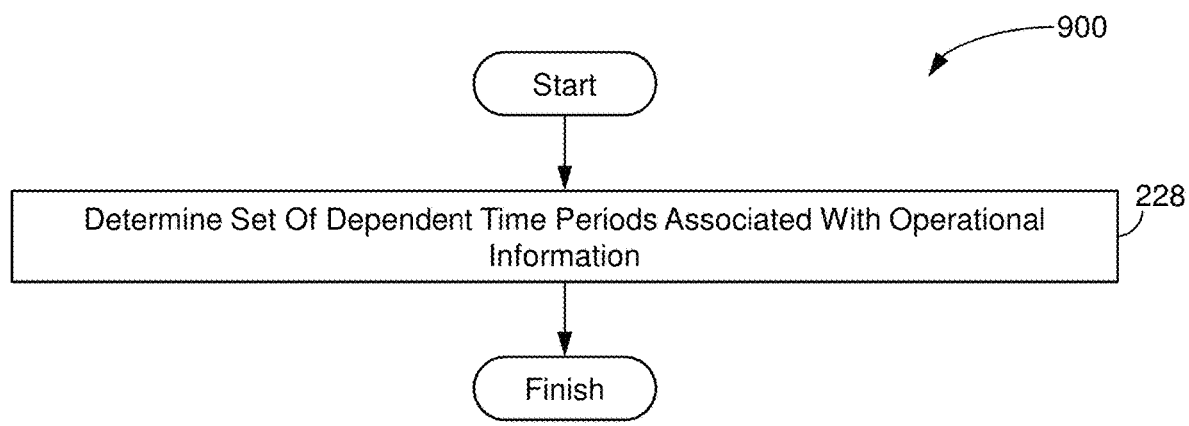

FIG. 9 illustrates another example process that can be used in conjunction with other processes or steps described herein or as alternatives to one or more steps described herein. According to one embodiment, process 900 and begin at 228 with determination of a set of dependent time periods associated with operational information (e.g. work information, code review information, ticketing information, etc.).

Figure 10:
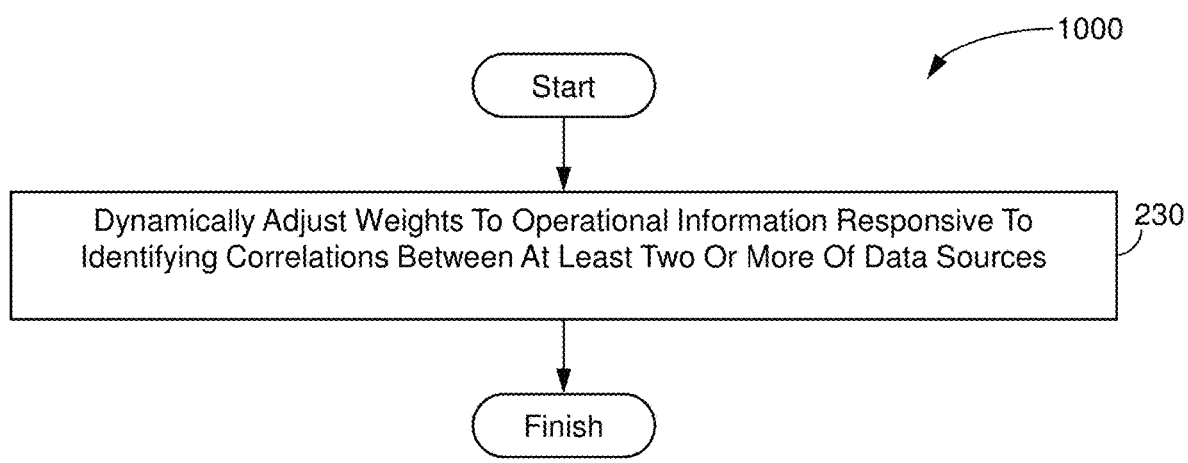

FIG. 10 illustrates another example process that can be used in conjunction with other processes or steps described herein or as alternatives to one or more's steps described herein. According to one embodiment process 1000 can begin at 230 with dynamic adjustment of weights given to operational information. In one example such weights are dynamically adjusted responsive to identifying correlations between at least two or more data sources or information inferenced from multiple data sources.

Figure 11:
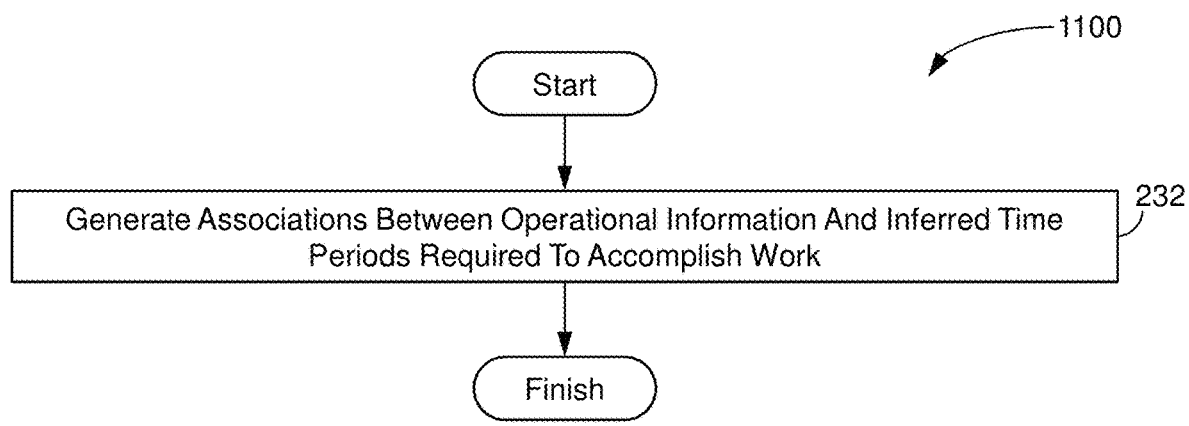

FIG. 11 illustrates an example process that can be used in conjunction with other processes or steps described herein or as alternatives to one or more steps described herein. According to one embodiment, process 1100 can begin at 232 with the generation of associations between operational information and one or more time periods required to accomplish the work associated with the operational information. In one example, the one or more time periods can be inferred by the system or analysis kernels as described herein.

Figure 12:
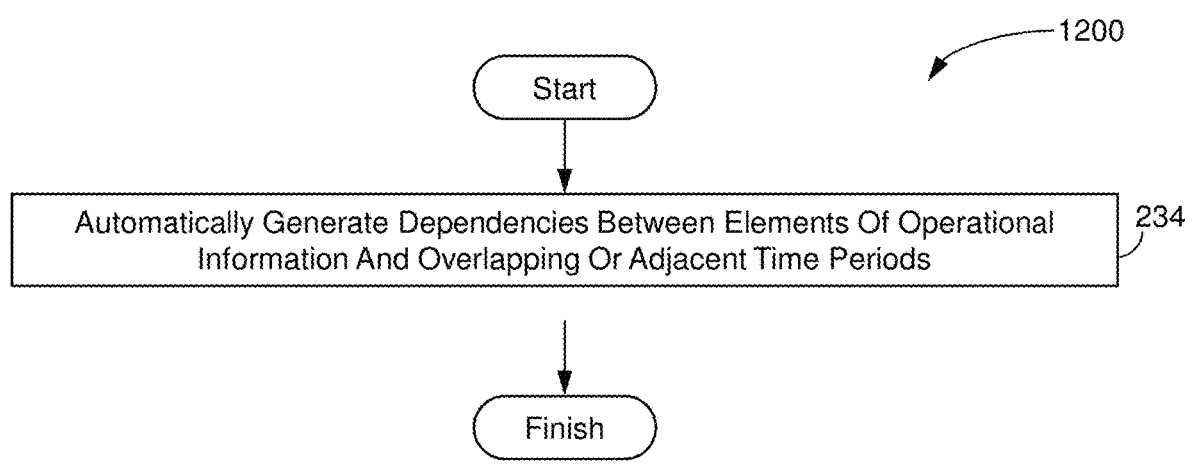

FIG. 12 illustrates a process that can be used in conjunction with other processes or steps described herein or as alternatives to one or more steps described herein. According to one embodiment, process 1200 can begin at 234 with generation of dependencies between elements of operational information. Step 234 can be executed automatically based on analysis of the received information. In some examples step 234 can include execution of the analysis kernels described herein to automatically create dependencies between instances of operational information and associated time periods. In further example, process 1200 can create dependencies between instances of operational information in overlapping or adjacent time periods.

Figure 13:
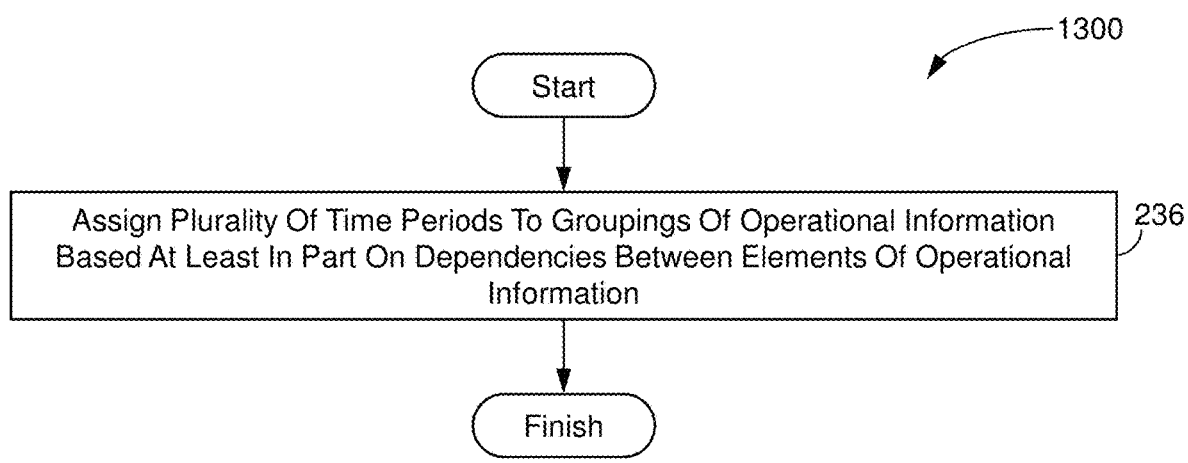

FIG. 13 illustrates a process that can be used in conjunction with other processes or steps described herein or as alternatives to one or more steps described herein. According to one embodiment, process 1300 can begin at 236 with assignment of a plurality of time periods to groupings of operational information. The groupings can be created automatically based at least in part on dependencies between elements of operational information generated in other processes. In another example, groupings of operational information can be based on analysis executed using the analysis kernels described below.

Figure 14:
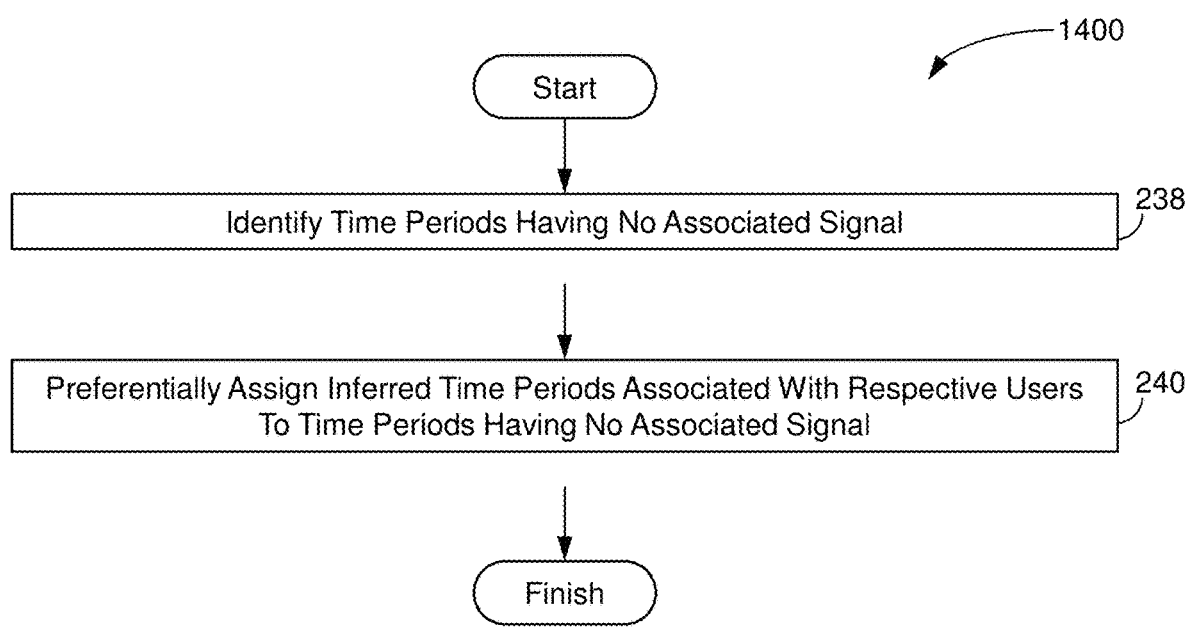

FIG. 14 illustrates a process that can be used in conjunction with other processes or steps described herein or as alternatives to one or more steps described herein. According to one embodiment, process 1400 can begin at 238 with identification of time periods having no associated signal. In one example, analysis can include filling time range when work is expected to occur. For example, between the hours nine and five in inference model can be expected to establish at least some work for each time period. According to one embodiment, process 1400 can continue at 240 with preferential assignment of inferred time periods to the time periods having no associated signal. According to one embodiment, the inferred time periods associated with respective users will be used to fill in empty timeslots (e.g., time periods having no associated signal).

Figure 15:
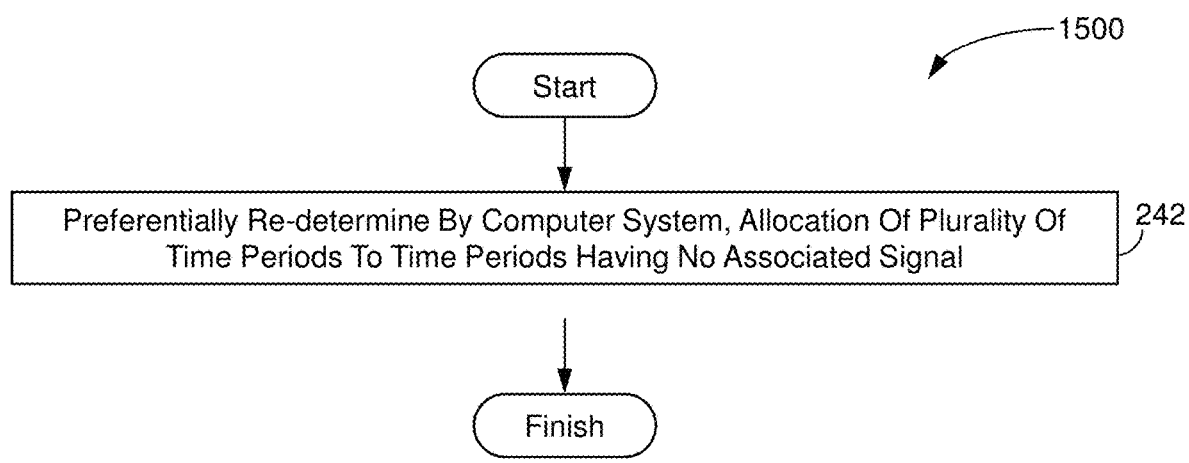

FIG. 15 illustrates a process that can be used in conjunction with other processes or steps described herein or as alternatives to one or more steps described herein. According to one embodiment process 1500 can begin at 242 with redetermination of time allocations to the time periods having no associated signal. According to one example, step 242 can be executed with preferences defined by corroborated information (e.g. inferred data having a greater number of corroborating sources will be used preferentially).

Figure 16:
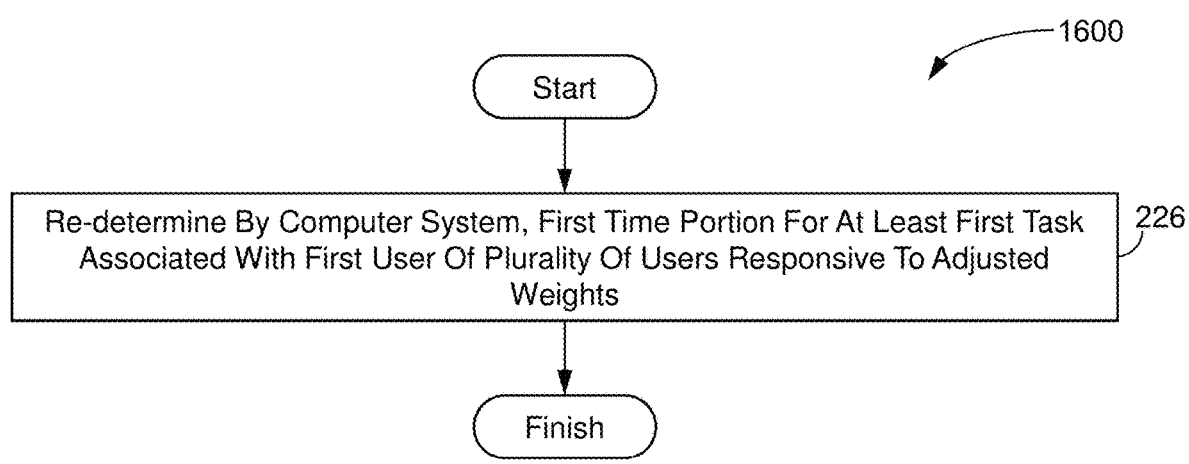

FIG. 16 illustrates a process that can be used in conjunction with other processes or steps described herein or as alternatives to one or more steps described herein. According to one embodiment process 1600 can begin at 226 and include redetermination of at least a first time portion for at least the first task associated with the first user responsive to determination of adjusted weights (e.g., based on subsequent corroborating information).

One aspect of the present disclosure relates to a system configured for optimizing automated modelling of resource allocation. The system may include one or more hardware processors configured by machine-readable instructions. The processor(s) may be configured to receive or retrieving, by a computer system, operational information associated with a plurality of users. The processor(s) may be configured to allocate, by the computer system, at least a first time portion to at least a first task associated with a first user of the plurality of users based on analysis of the operational information. The processor(s) may be configured to dynamically modify, by the computer system, the first time portion responsive to receiving or retrieving additional operational information over time.

In some implementations of the system, the act of allocating may include allocating, by the computer system, a second time portion to a second task associated with a first user of the plurality of users based on analysis of the operational information. In some implementations of the system, the act of allocating may include allocating, by the computer system, a third time portion to a third task associated with a first user of the plurality of users based on analysis of the operational information.

In some implementations of the system, the processor(s) may be configured to execute at least a first application programming interface. In some implementations of the system, the processor(s) may be configured to manage, by the first API, receipt or retrieval of the operational information from a software version control subsystem. In some implementations of the system, the processor(s) may be configured to execute a second API. In some implementations of the system, the processor(s) may be configured to manage, by the second API, receipt or retrieval of the operational information from a software ticketing system. In some implementations of the system, the processor(s) may be configured to execute a plurality of APIs. In some implementations of the system, the processor(s) may be configured to manage, by the plurality of APIs, receipt or retrieval of the operational information from a plurality of respective data sources including at least software version control subsystems, software ticketing subsystems, time tracking subsystems code repository subsystems g, software development/messaging subsystems and project management subsystems. According to various embodiments, the system can capture data from a variety of source via a variety of methods including retrieval by API, or other similar means (e.g., webhooks, copied data, imported data, logged data, tracking objects, etc.).

In some implementations of the system, the act of allocating may include associating, by the computer system, a plurality of users identities across a plurality of information sources to respective users and respective task based information. Another aspect of the present disclosure relates to a method for optimizing automated modelling of resource allocation. The method may include receiving or retrieving, by a computer system, operational information associated with a plurality of users. The method may include allocating, by the computer system, at least a first time portion to at least a first task associated with a first user of the plurality of users based on analysis of the operational information. The method may include dynamically modifying, by the computer system, the first time portion responsive to receiving or retrieving additional operational information over time. Yet another aspect of the present disclosure relates to a non-transient computer-readable storage medium having instructions embodied thereon, the instructions being executable by one or more processors to perform a method for optimizing automated modelling of resource allocation. The method may include receiving or retrieving, by a computer system, operational information associated with a plurality of users. The method may include allocating, by the computer system, at least a first time portion to at least a first task associated with a first user of the plurality of users based on analysis of the operational information. The method may include dynamically modifying, by the computer system, the first time portion responsive to receiving or retrieving additional operational information over time.

Example User Interfaces

Figure 19:
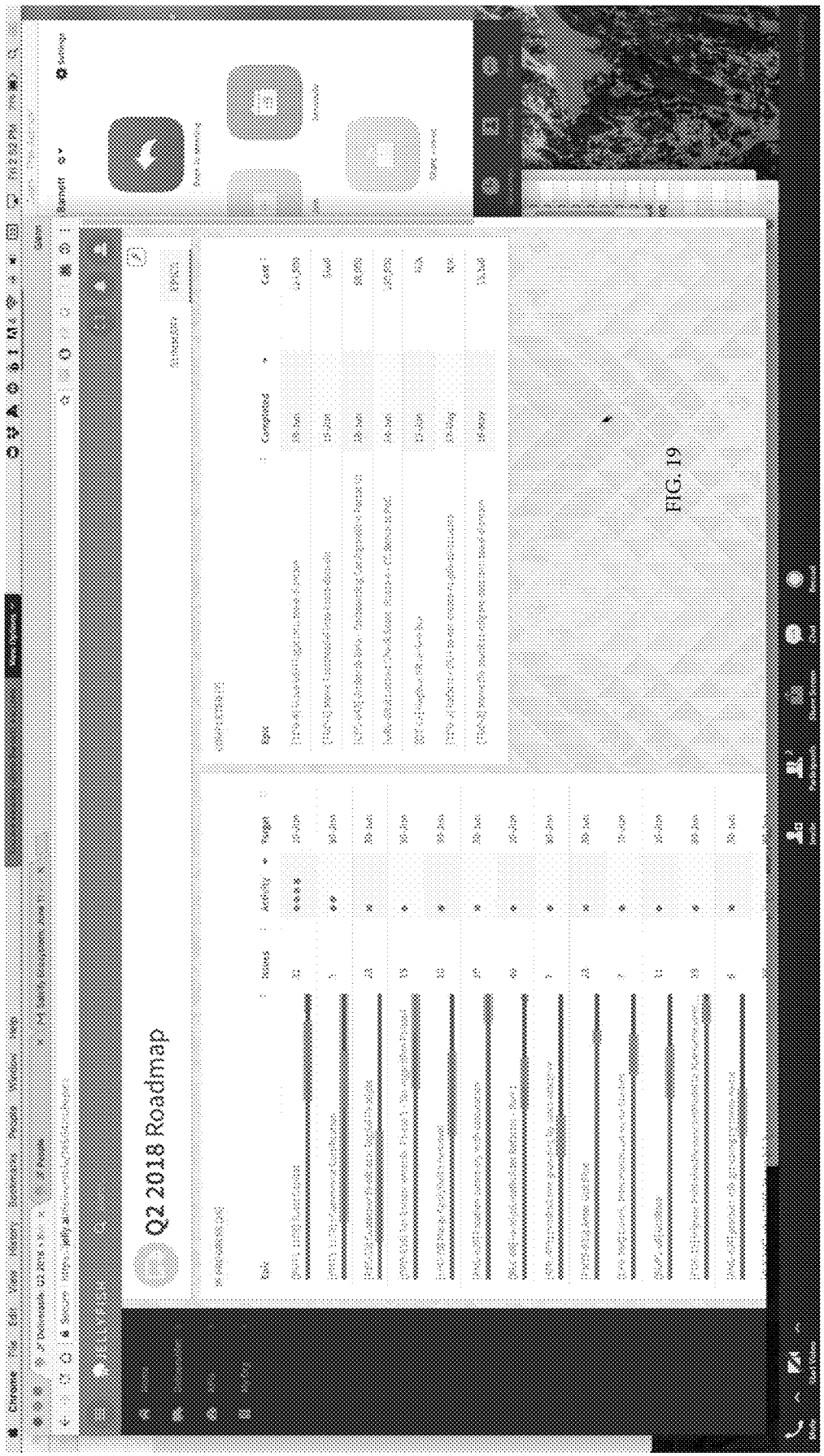
Figure 20:
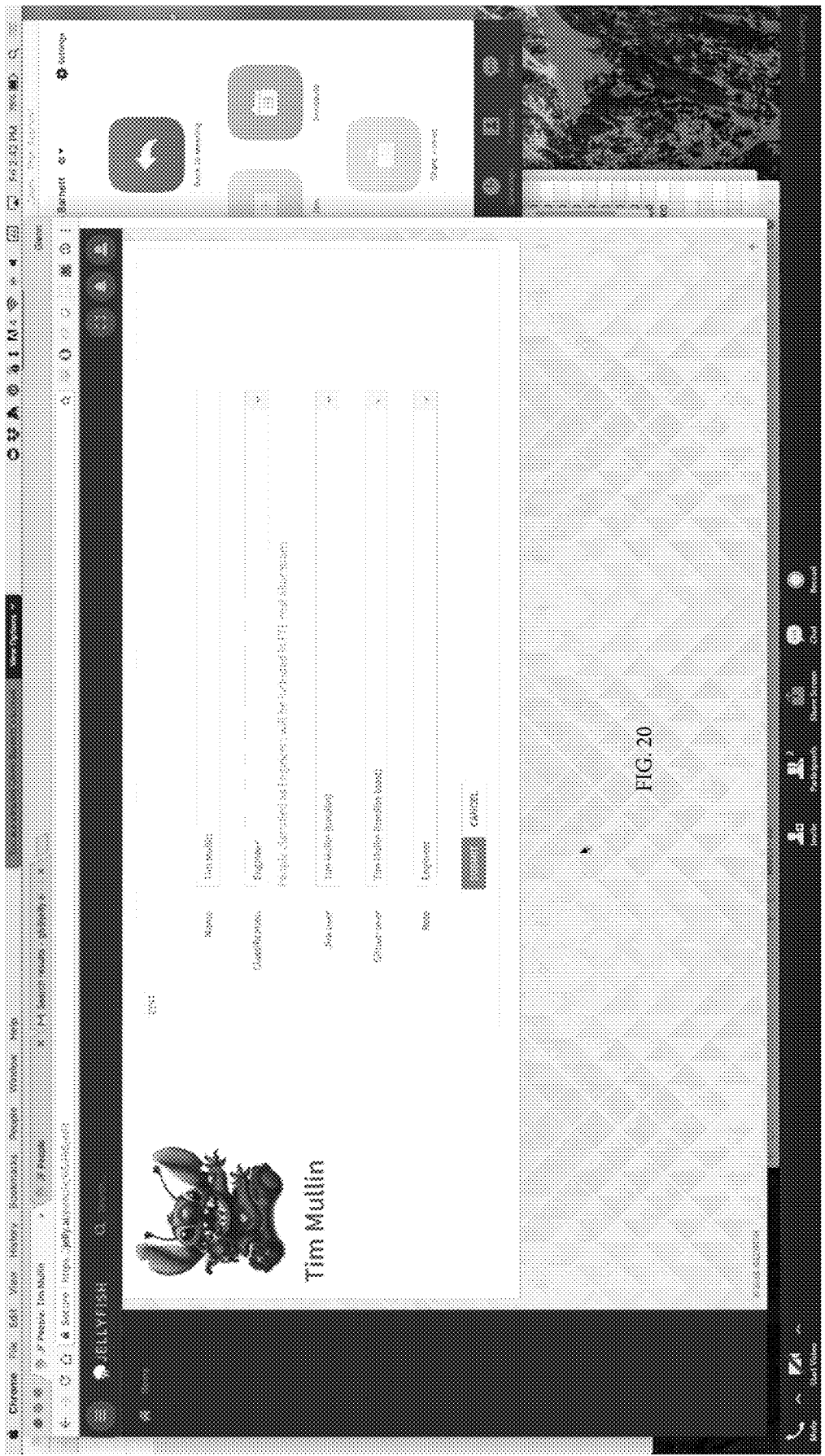

Shown in FIG. 19 is an example user interface. According to one embodiment, the system can present a plurality of user interfaces. In one example a project roadmap including information on individual tasks for the project can be displayed. For example FIG. 19 shows a Q2 2018 roadmap for a plurality of tasks. FIG. 20 illustrates the user interface for identifying a worker on the system. In various examples, the system will allocate time portions or time ranges to respective workers and associate tasks to those time ranges and workers.

Figure 21:
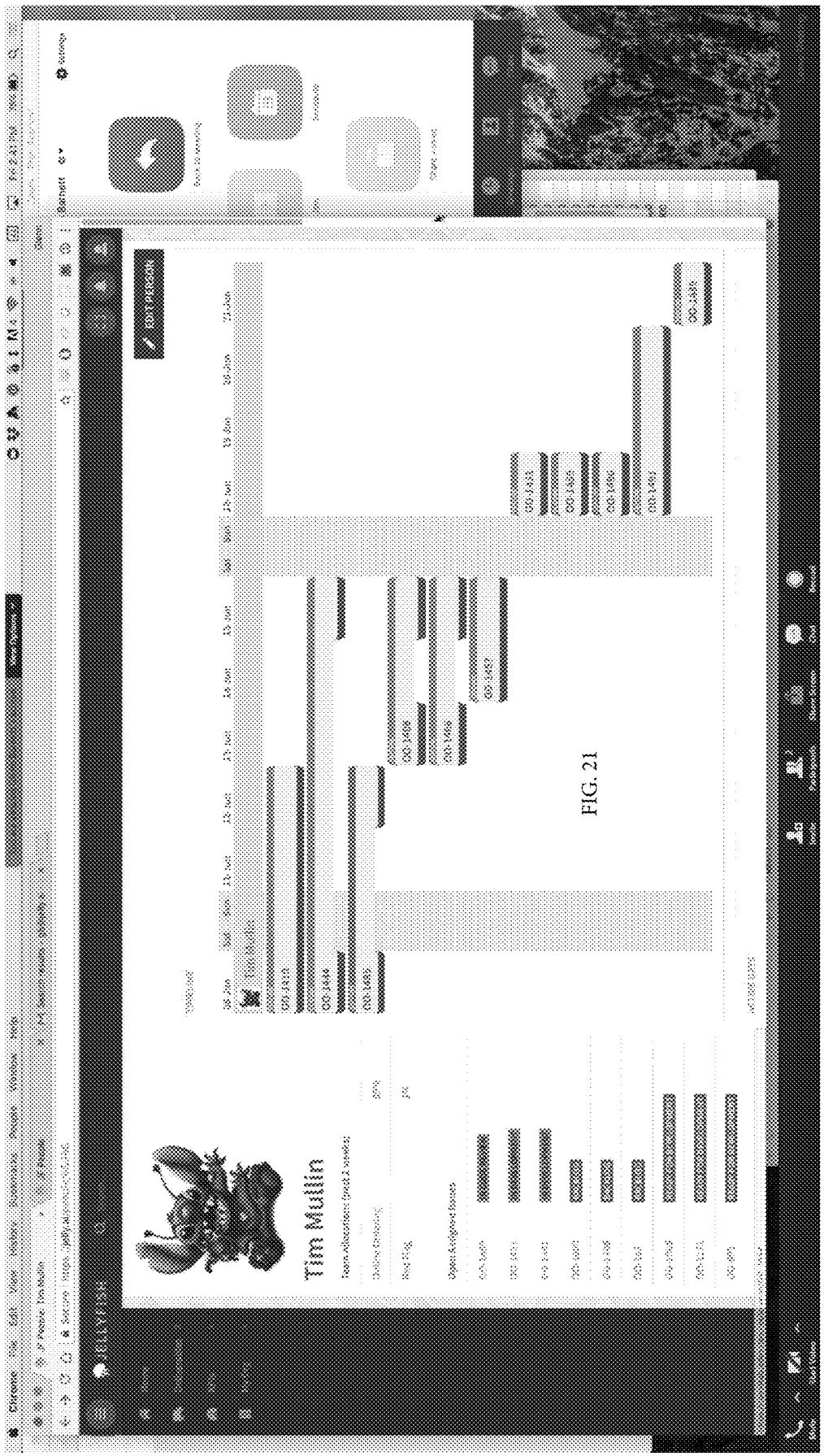
Figure 22:
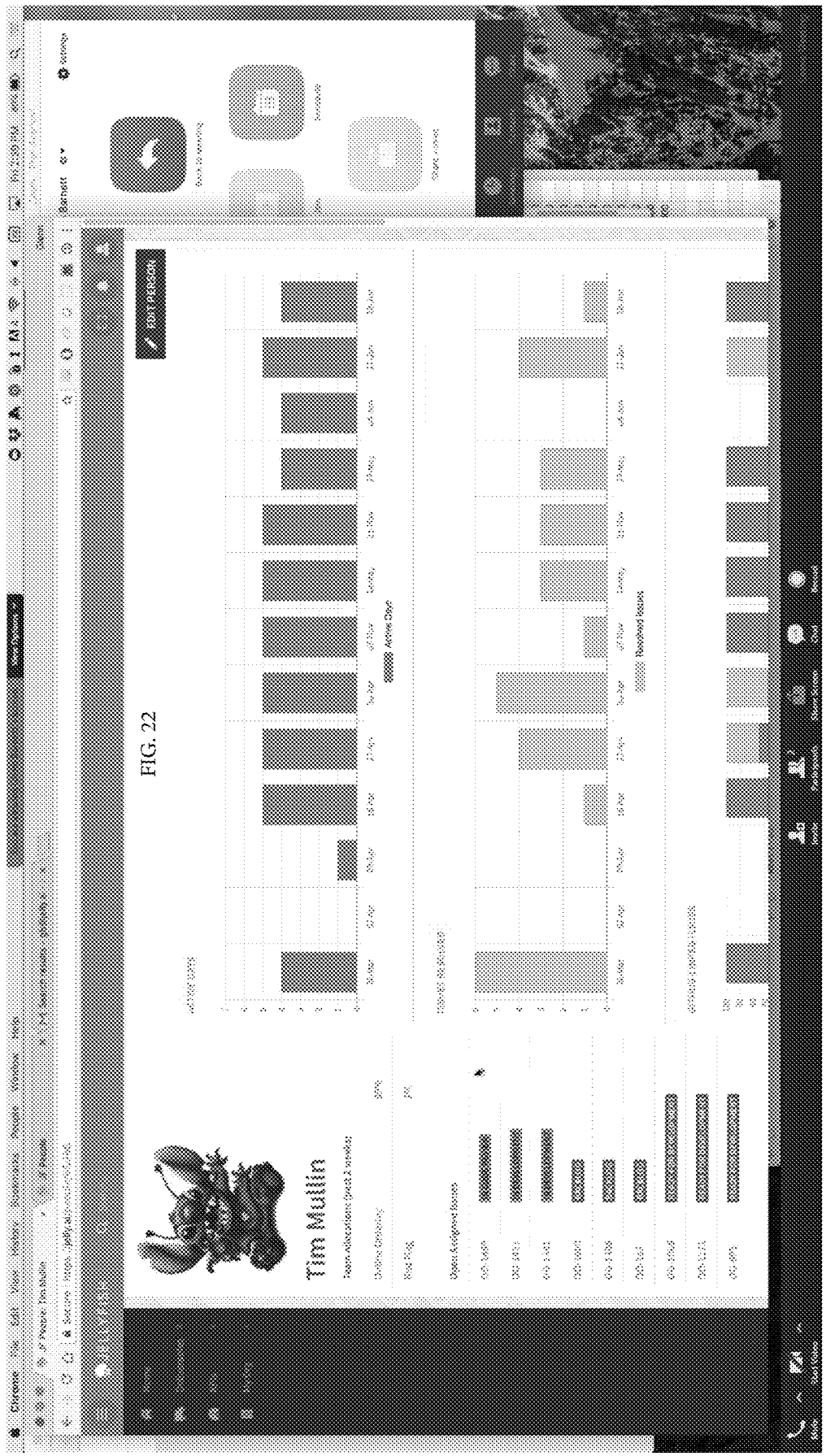

For example, FIG. 21 illustrates a display showing probabilistic time allocations to the time spent by a worker (e.g., Tim Mullen). In some examples, the time allocations are assigned to specific tasks (e.g., in code review, in development, backlog, ready for development, etc.). According to another embodiment, various user interfaces can be accessed on the system to manage presentation of work in probabilistic allocation information. In another example, FIG. 22 shows an example interface for viewing active work days, resolved issues, and external source projects that can be the source of work information.

Figure 23:
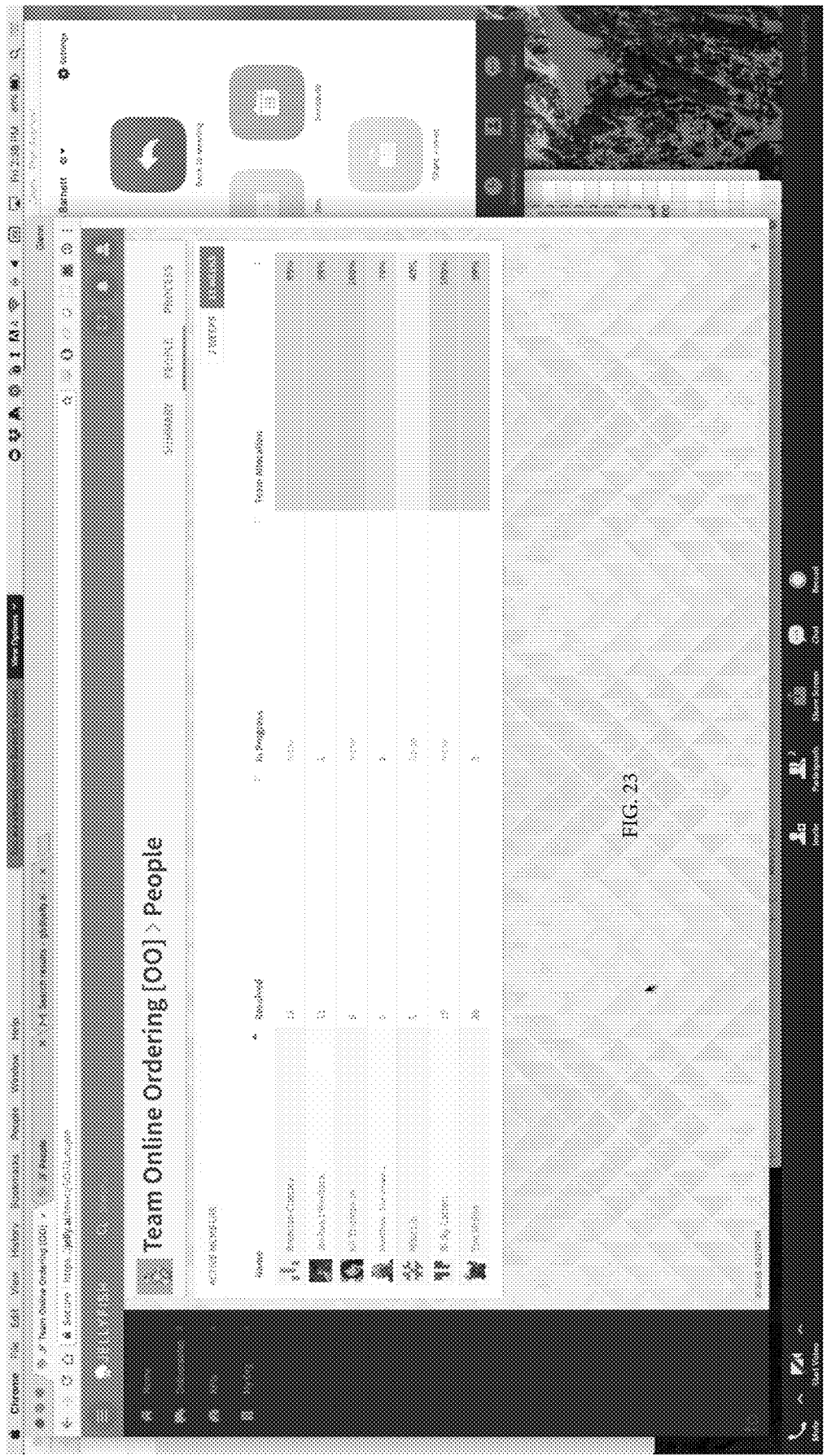

In further embodiments, the system can provide interfaces for grouping users/workers into organizational units. For example, a group of developers can be expected to work on similar projects and by grouping those workers, the system can improve modeling of their time and time allocations by adjusting the inferred information and drawing inferences across grouped information. In one example, FIG. 23 shows a screen capture of an interface for defining a working group. Worker organization groups can be defined for tasks, projects, or other units of organization.

According to some embodiments, the group structure can be extended to visualization of tasks and time allocation.

Figure 24:
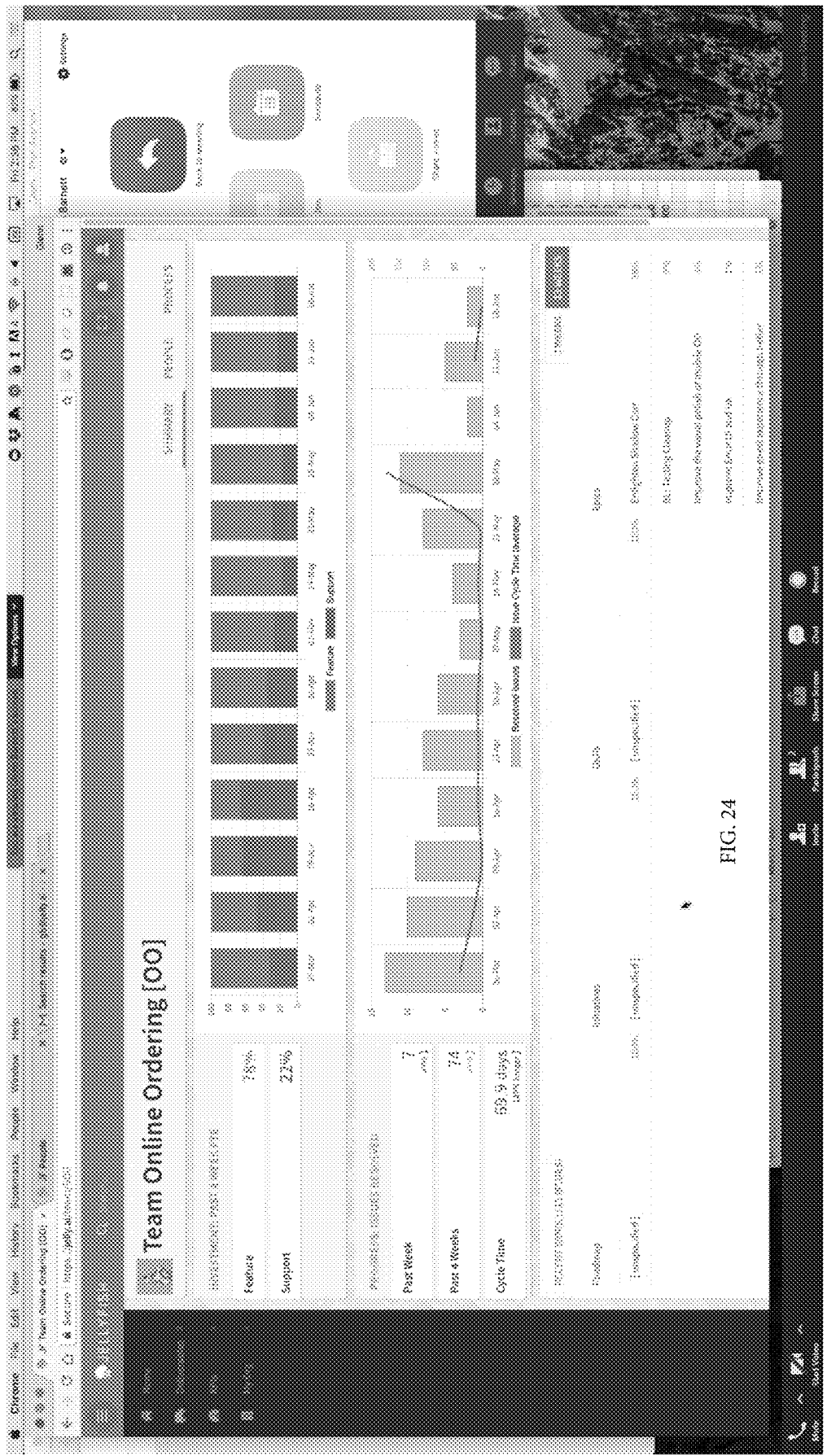
Figure 25:
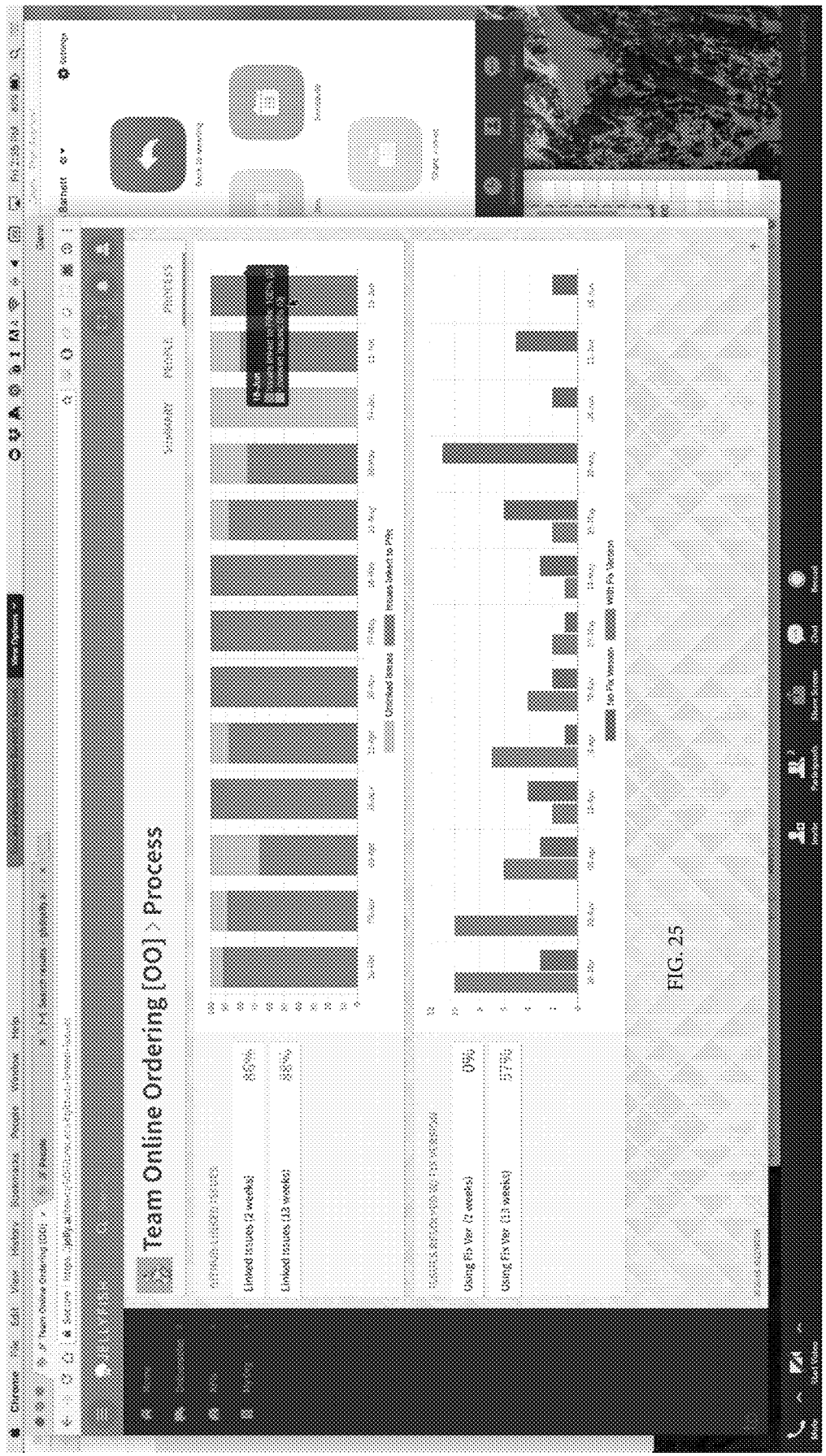

FIG. 24 illustrates one example of a screen capture for presenting task and time information based on the group organizational unit (e.g., team online ordering). FIG. 25 illustrates another example of a screen capture for a user interface configured to present information on work items (e.g. issues). Shown in the display are time periods for linked issues and an indication of how many issues are not linked. In FIG. 25, the interface displays information on issues that have fixes versus issues that need additional work or have no fix.

Figure 26:
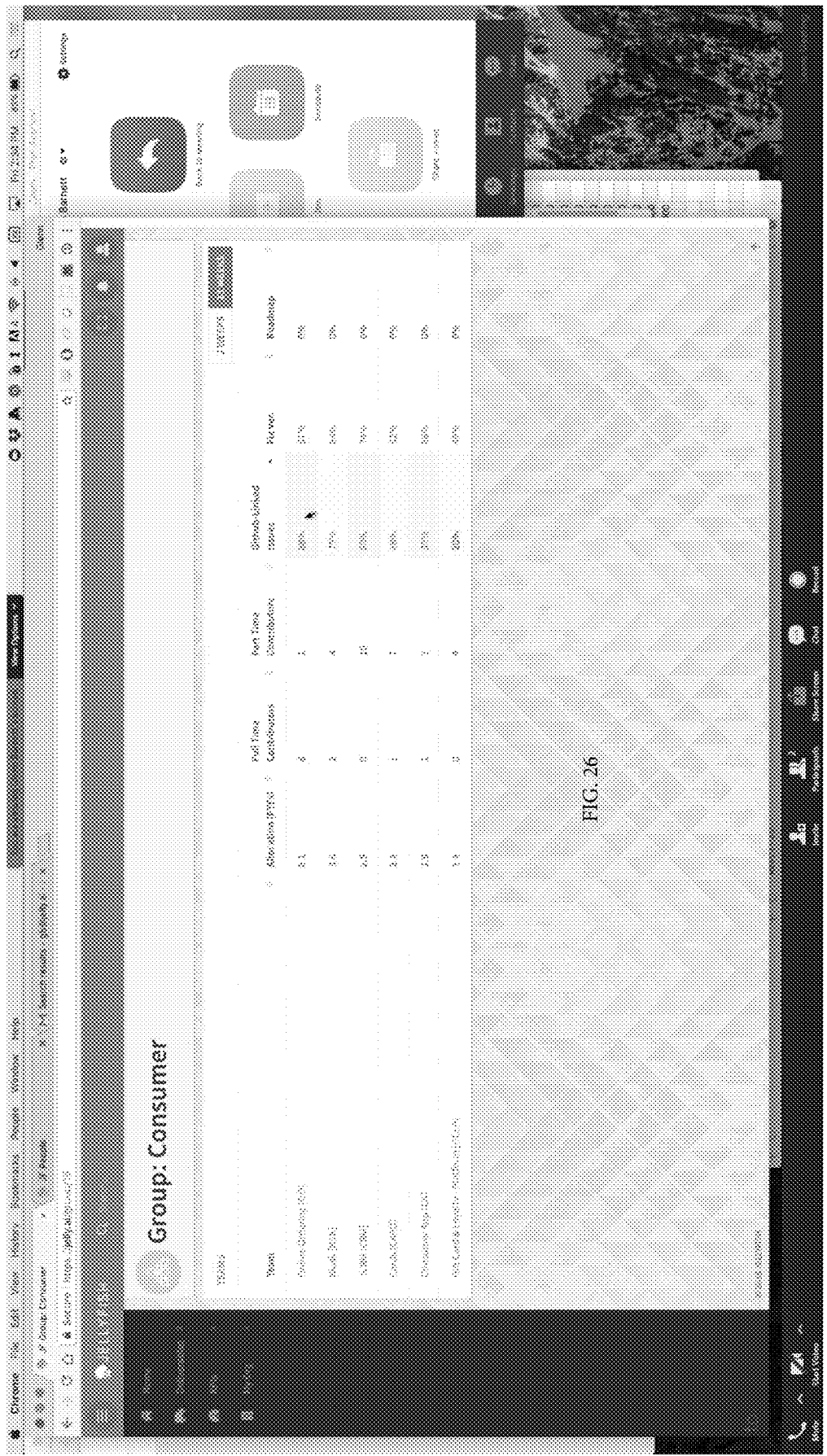
Figure 27:
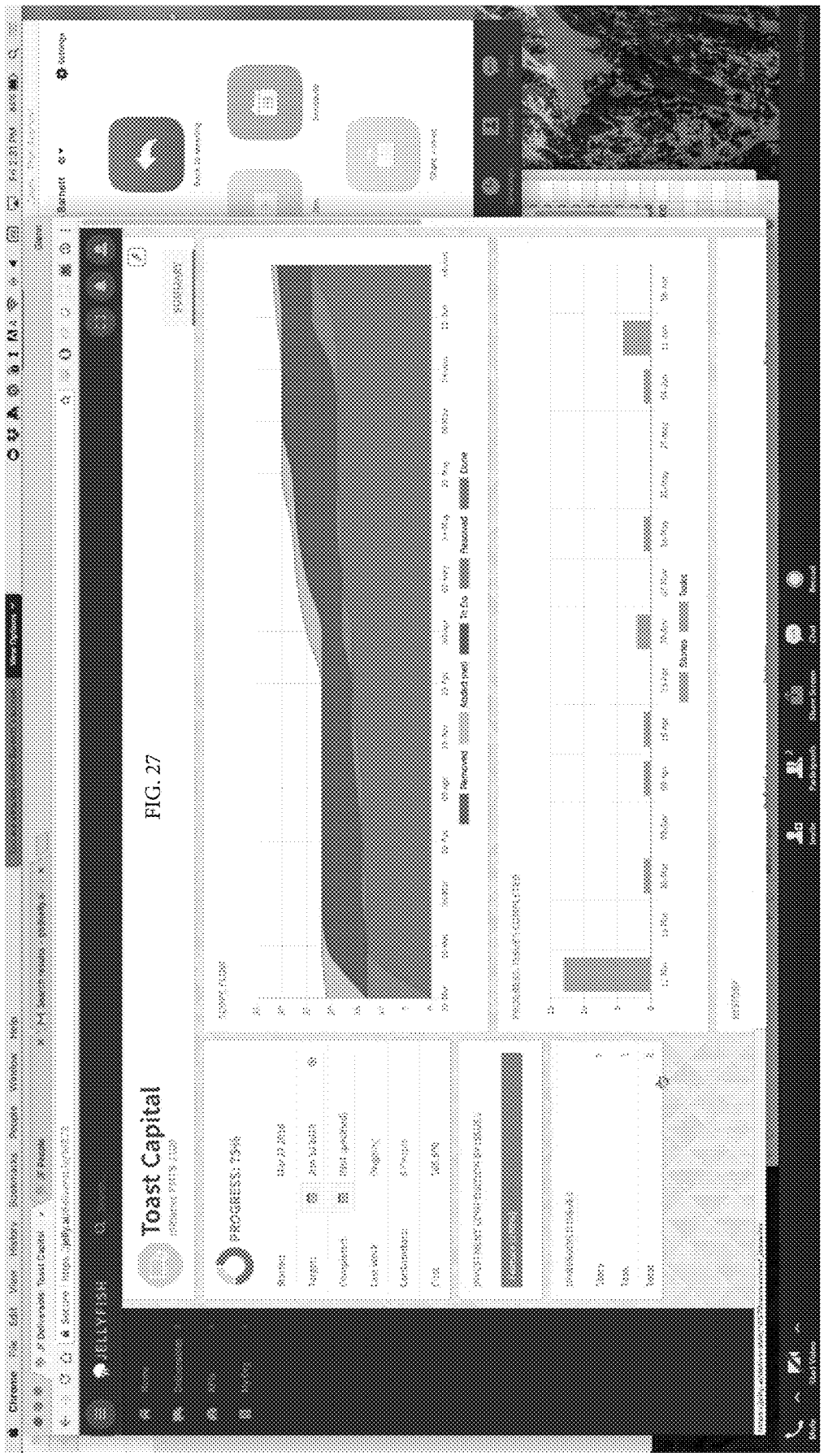
Figure 28:
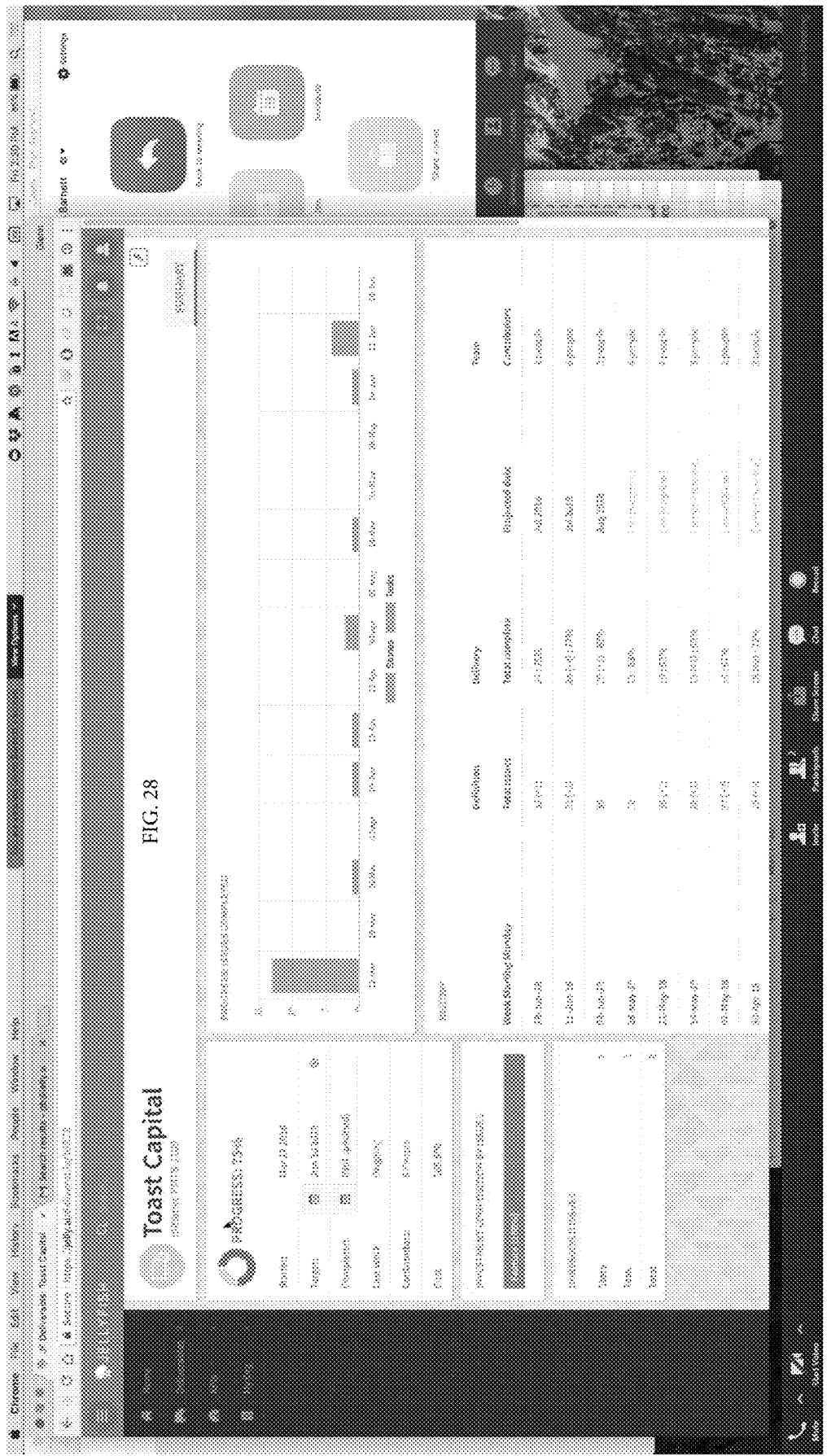

FIG. 26 illustrates an example screen capture for defining additional groups and/or displaying information on defined groups. FIG. 27 shows an example screen capture for an interface configured to display information on aggregate allocation (e.g., of time and/or resources) and to link the probabilistic work model to expected costs. In one example, the expected costs can be based on number of contributors working on issues, projects, and/or defined work unit and the allocation of time determined for the same. Shown in FIG. 28 is an interface that enables a administrator/manager (e.g., or other user with permission) to drill into specific details on the aggregate information shown in FIG. 27. According to various embodiments, projects and time allocation information can be organized in any number of ways. According to one example, various work items and/or projects can be organized based on deliverables required and dates for turning over the same deliverables.

Figure 29:
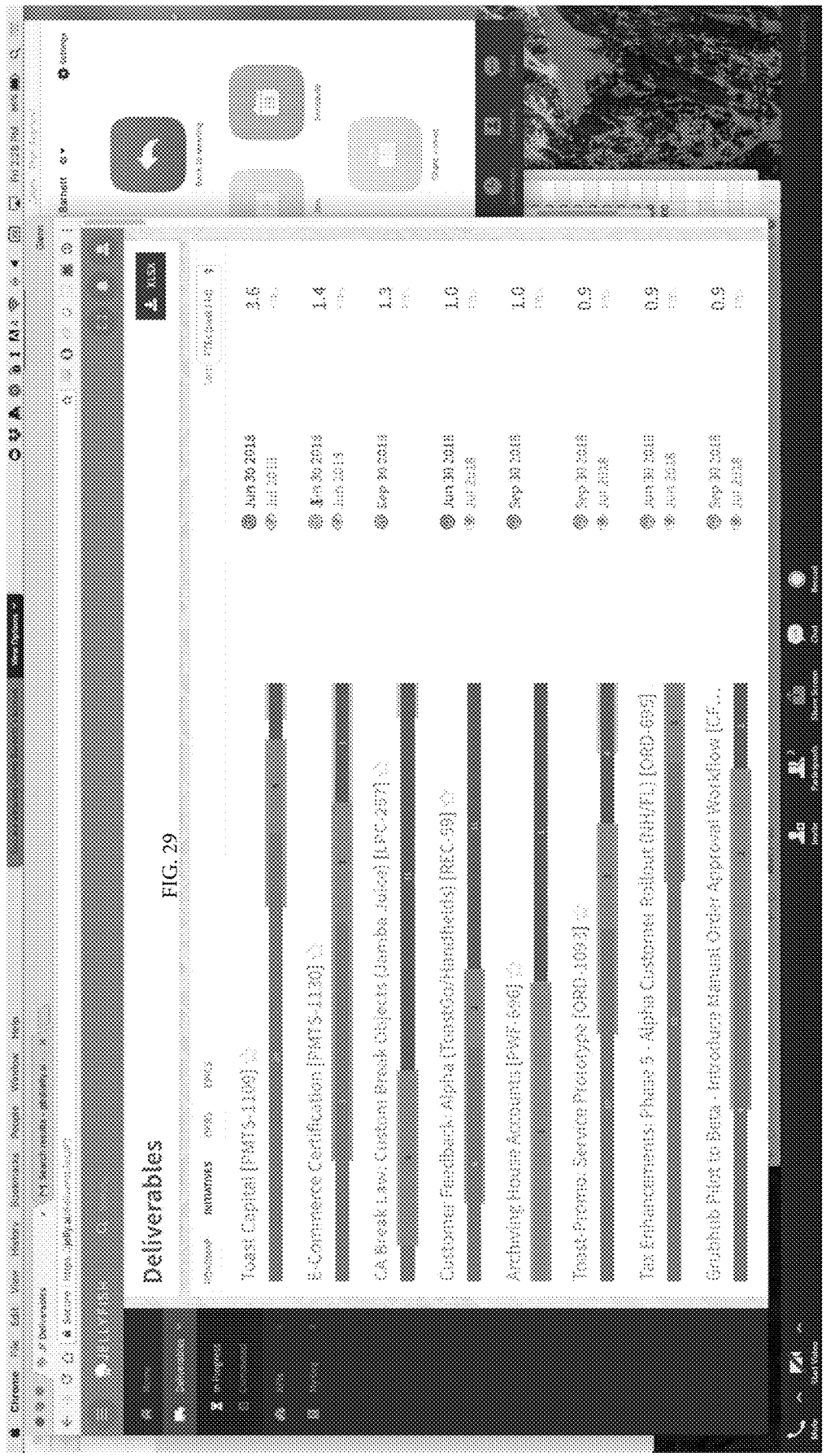
Figure 30:
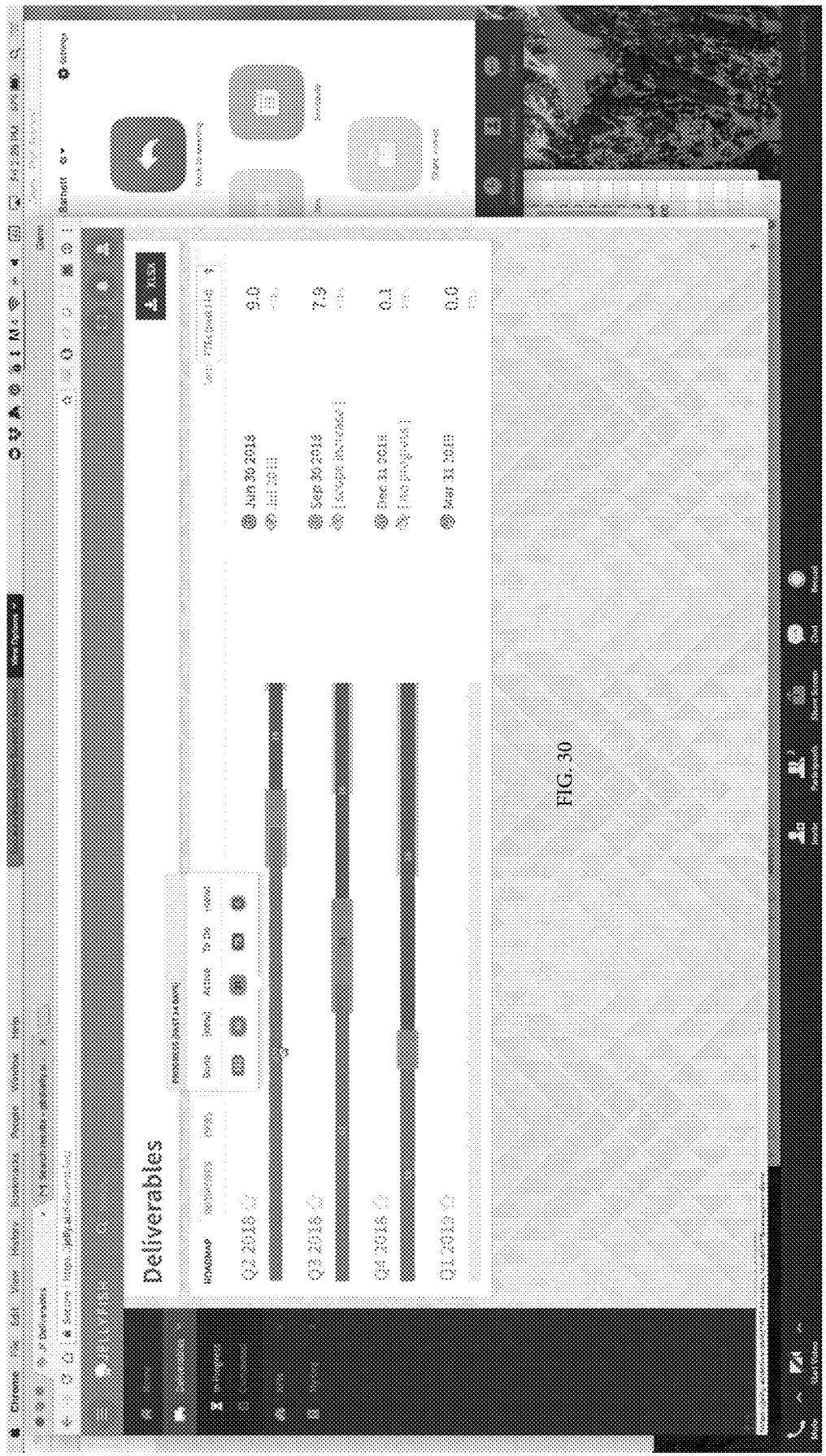
Figure 31:
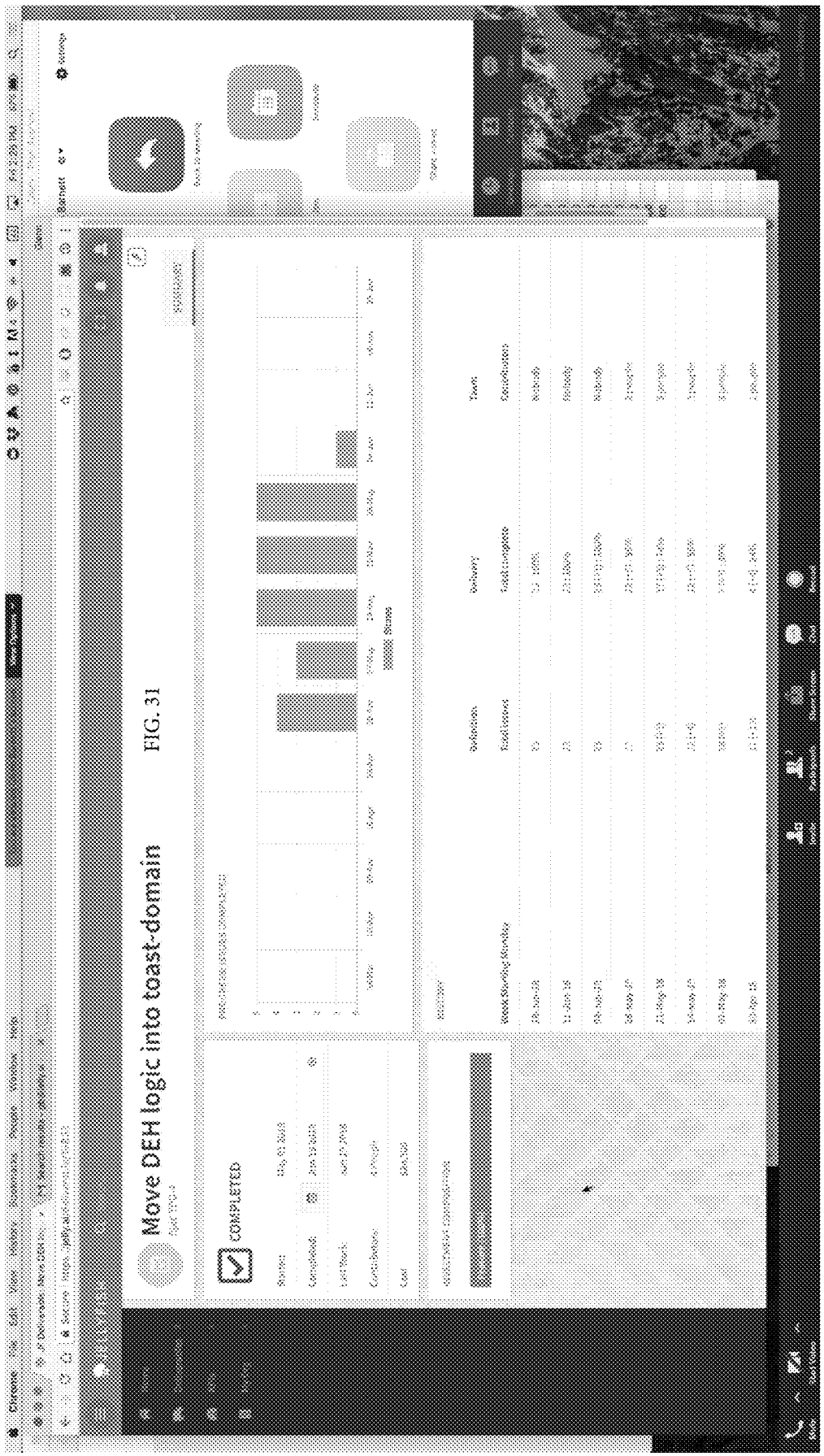
Figure 32:
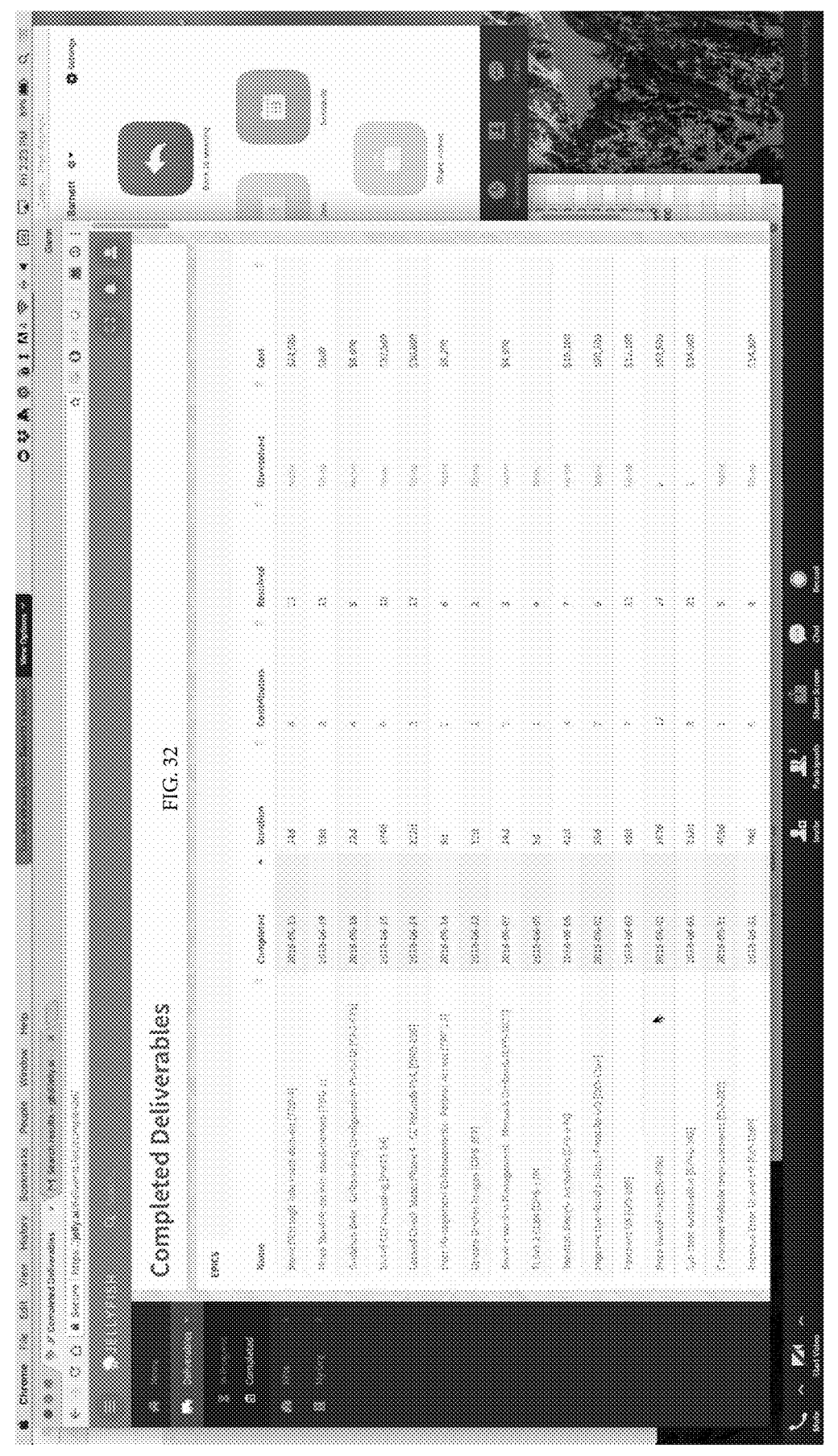

FIG. 29 is an example screen capture of an interface for managing projects based on deliverables and timelines for meeting the deliverable date. FIG. 30 is another example screen capture showing information on deliverable and expected delivery date based on current and future time frames. In some embodiments, any information shown in the interface can be used to access additional detail. For example, FIG. 31 is a screen capture of an example interface for showing detailed information accessed from a deliverables view. FIG. 32 shows another example screen capture that provides access to completed deliverable information.

Figure 33:

FIG. 33 is a screen capture of an example interface for displaying and managing task-based information within a project and/or group. According to one embodiment, within a given project the system provides access to aggregate task information over time. In this manner, the system provides access to summary information based on categorization of tasks (e.g., unassigned, lowest, low, medium, high, highest, resolved, etc.). For example, based on a few data points comprising an incomplete information set the system can infer time required for specific tasks time available for workers in an organizational unit, and enable tracking of all work done on the tasks within an organizational unit to provide a comprehensive display based on a complete data model inferenced from the incomplete information.

Figure 34:
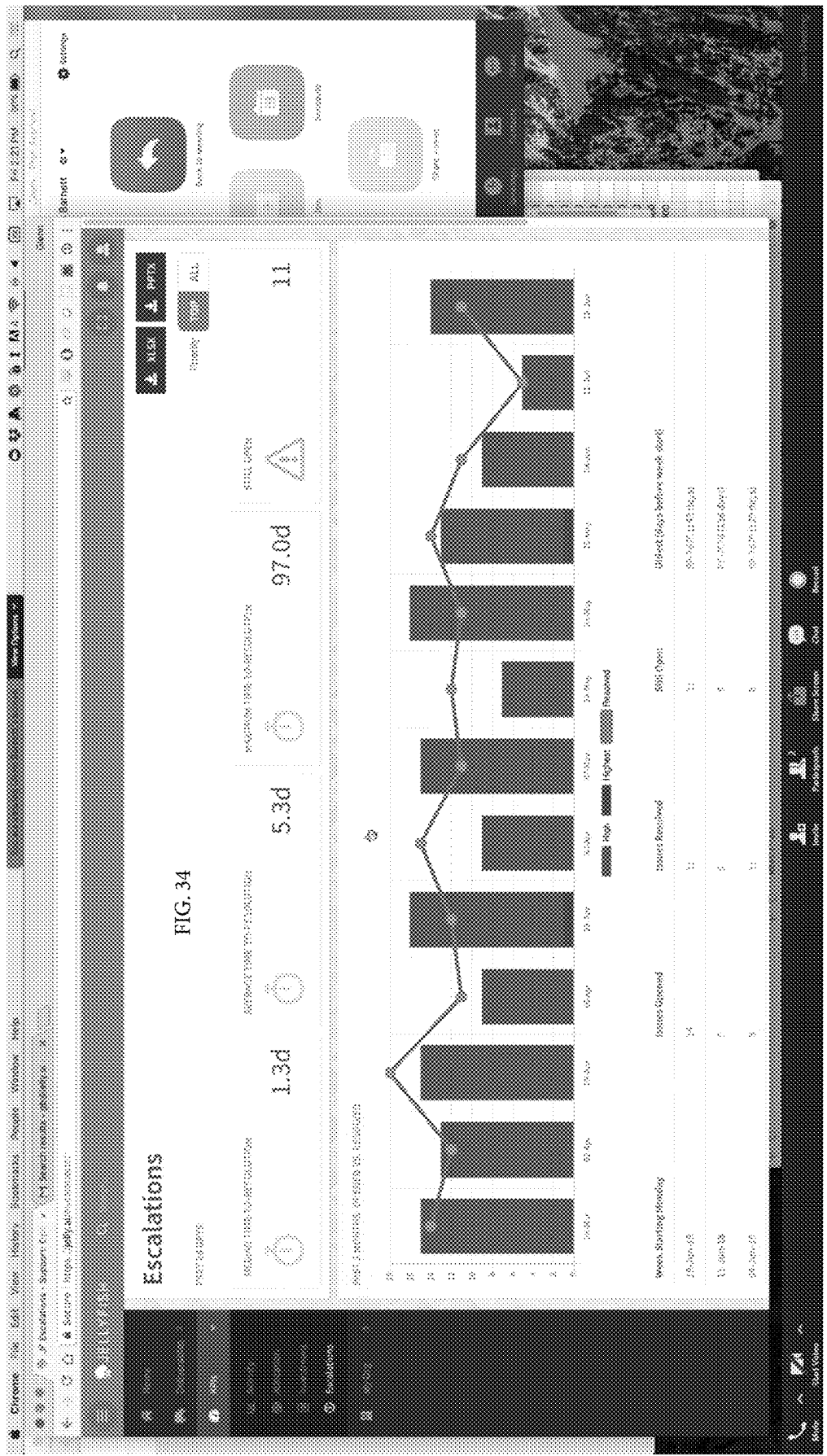
Figure 35:
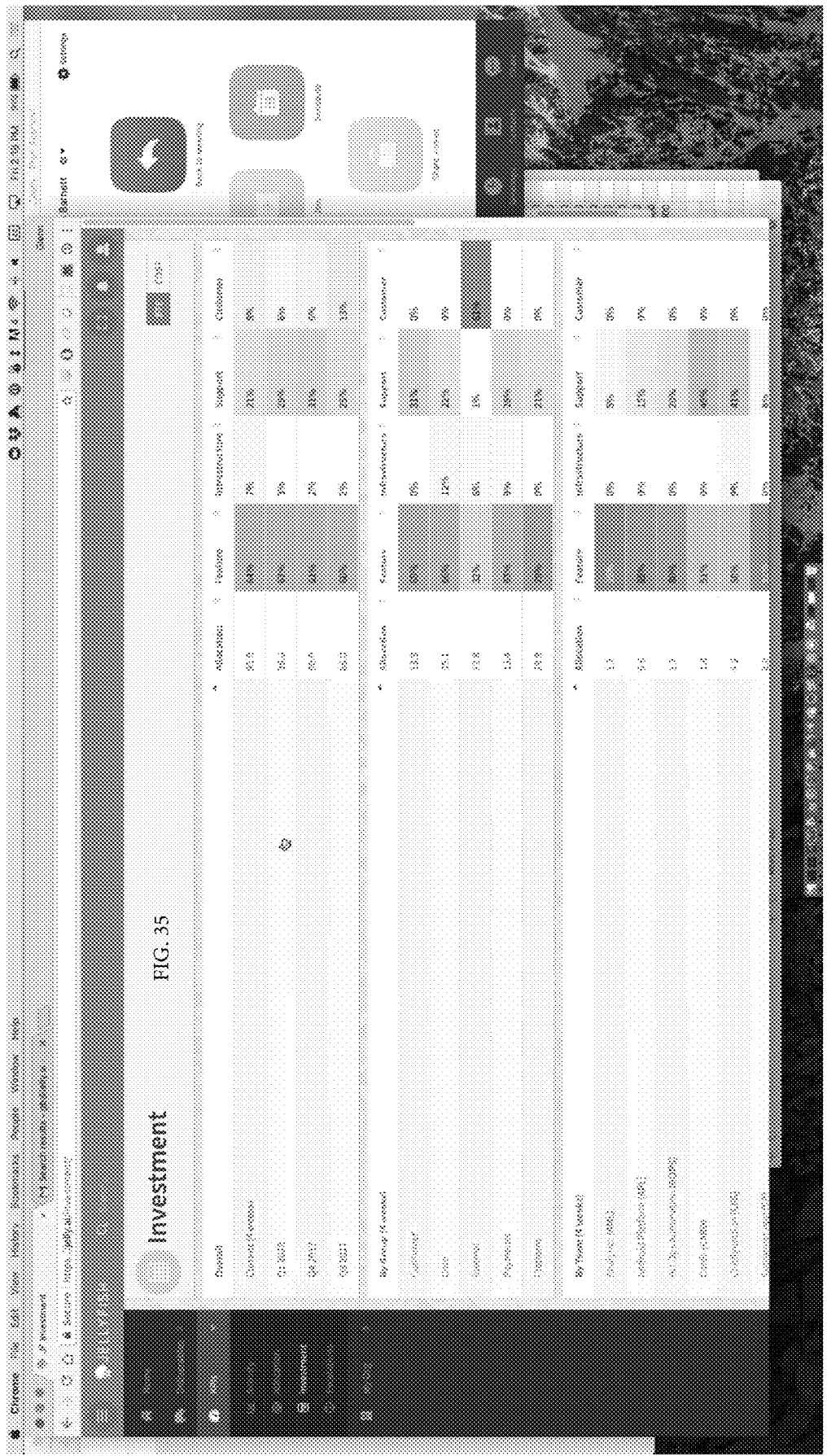
Figure 36:
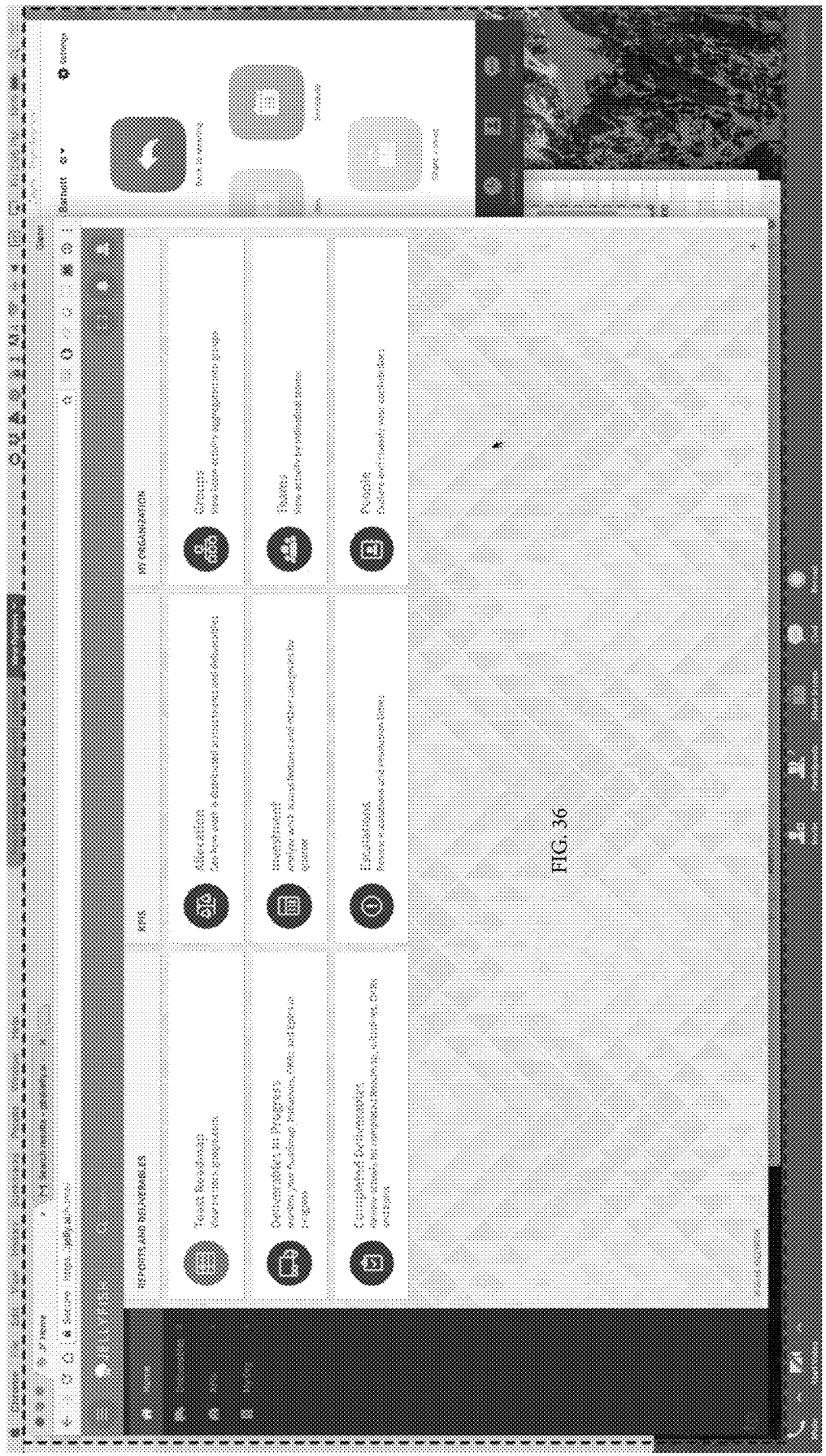

In various embodiments, such functionality overcomes limitations of conventional systems that cataloged overcome incomplete information. In further example, the task in group information can and also include categorization of work items. In one example, an interface can provide access to information on task categories. FIG. 34 shows an example screen capture of an interface for accessing information on the escalations category of work task. The system can provide various metrics and aggregate information abuse. For example FIG. 35 shows an example screen capture of information describing investment (e.g. time and/or money spent). For example, this type of view is enabled by creating a complete data set based on a probabilistic model and enables the extension of an incomplete data set into usable information (unlike conventional approaches —which can-not provide such analysis without complete information sets). FIG. 36 shows an example screen capture of a key performance indicator menu. As show, the system provides interfaces for accessing information on Allocation (visualization/analysis of how work is distributed), Investment (visualization/analysis of work against spend/budget), Escalations (visualization/analysis of resolutions), Groups (visualization/analysis of worker groupings), Teams (visualization/analysis of Team groupings), and People (visualization/analysis of individual workers), among other options.

Examples of Time Period Translation

According to various embodiments, the system is configured to translate task based information or other data point that establish work performed by a workforce. The data points can include timing information associated with when the data point was created, modified, or last acted on, for example. The data points or operational information can include references to specific users responsible for the task and/or data point. The system executed learning models to establish a period of time for such data points and associates them with the respective users that are tied to those data points. For example, in the JIRA tracking system, bug reports are assigned to users to resolve. Responsive to the open ticket status changing to close, the user responsible for the ticket can be identified and associated with work reflecting at least a period of time proximate to the change in state. Where the same user operates on multiple tickets, the learning algorithms are configured to allocate time periods to each task, and in some examples, do so in dependency on the other task and respective time periods.

According to some embodiments, the system is configured to monitor work assignments, for example, through respective tracking systems. In one example, a developer can be assigned a work ticket in JIRA. Responsive to the ticket assignment, the system monitors status of the ticket, including for example, state change from assigned to in-progress. The system uses this state change to apply work started analysis, rules, intelligence and/or models. Further state changes are treated in a similar fashion. For example, a state change closing the ticket, would trigger work ended analysis, rules, intelligence and/or models. In another example, assignment changes for a ticket (e.g., new developer assigned) can include analysis to determine that the original user has (likely) stopped working and a new user is now responsible. According to one embodiment, the system can now use the state change for a work stop point on the original user. In further embodiments, new data signals, for example, showing the original user committed new code to the project can trigger re-evaluation of the stop point and redistribution of time between the original and subsequently assigned developers.

In further embodiments, the system is configured to map state changes in tracking data or work assignment information independently, and capture underlying activity date and/or time to create a work period start time or end time. In some implementations, the modelling of time periods begins with a first source on tracking or assignment information, that the model refines with the additional of a second data source of tracking or assignment information. In one example, JIRA ticketing information triggers generates a view of time periods that reflect the probable time worked. The generated estimates are then refined by the system as additional data sources are analyzed and identified as belonging to the same work item. For example, GIT operations can be associated with JIRA tickets and the data from both sources used by the system to attribute time to respective users operating or referenced on either platform.

In another example, commits (e.g., saved code changes) in GIT can be mapped to a JIRA ticket via textual reference in the comments (e.g., automatically by the system) or a pull request (e.g., analyzed and linked automatically by the system) in Git to demarcate work beginning or activity associated with a respective time period to assign to respective users being references.

According to another example, the system can be configured to analyze commenting activity (e.g., with respect to software development) (e.g., code explanations or non-executable information embedded typically to improve understanding) on a JIRA ticket or a GITHUB pull request as another indicator as a worker performing work on something.

According to various embodiments, the system is configured to capture various signals associated with work performed, and each of these activities is used to demarcate some work time period on a specific task. In some examples, the union of time across all identified and/or inferred activities is used by the system to define the range of work, which can then be used to allocate across the time, or alternatively to establish fractions of time to assign to respective users. In another embodiment, the system is configured to model contributions and treat them as a various spot activities, which can be done as opposed to tying specific data points into one work range.

In some embodiments, machine learning algorithms are executed to capture activity information and optimize an approximation of time spent which is allocated across a plurality of users working on those activities. According to some embodiments, the ML algorithms are configured to determine "work span" and allocation portions of the work span to one or more users associated with a task. Generally, the system is configured to identify the beginning of work, assign the work span to a respective user until a task is complete. For example, a task (and work) begins when a developer is assigned to a ticket that is in progress or a ticket that is assigned is moved into in progress status. The end of the work span is identified by the system when that ticket is marked closed. In various implementations, the system is further configured to modify time period allocations based on identification of overlap with other tasks. In one example, a second task has overlapping time with the first task. The system is configured to reconcile time spent based on allocating a developer's time between the task. To provide a naïve example, the system can be configured to split resource allocations equally across both tasks. In some examples, the machine learning model balances each allocation of time for a task according to each data signal associated with the task and further discounts or distributes allocations for each user based on time assigned to other tasks or based on data signals indicating time spent on different tasks.

According to other embodiments, a ML approach is executed by the system to approximate how to ratio or "allocate" a user's time based on the total of data signals associated with a task, discounted or distributed with data signals indicating time spent on other tasks. In one example, the ML approach is trained by verifying resource allocations with the user performing the work. For example, the system solicits from the user—'on Tuesday I spent 3 hours on X, and 2 on Y'. The learning system is then trained based on the confirmed signals (e.g., Tuesday 8 am, story moved to in-progress, user assigned 8:45 am, check-in on project b at 9:01, project A: had a comment at 2:00 pm, etc. . . . and from these signals the system trains a neural network to determine that the given signals equate to 3 hours on A and 2 on B).

Thus, various embodiments, can use rules and intelligence to determine resource allocations, and other embodiments, can fit the data to models of resource allocations, and yet others can implement both types of approaches. In some examples, "truth" data (or directly querying the worker) can be captured by survey of a user, or using some other third party signal that the system uses as an accurate source of time than just jira/git/github activities.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive, for example, so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for optimizing automated modelling of resource allocation, the system comprising:
  at least one processor operatively connected to a memory;
  a capture component, executed by the at least one processor, configured to:
    automatically retrieve an incomplete set of operational information associated with a plurality of users, the incomplete set of operational information including a plurality of work interaction events associated with a first user of the plurality of users;

generate probabilistic values indicative of respective probabilities that the first user worked on a set of tasks at a first time interval including a first start time and a first end time by extrapolating the plurality of work interaction events, wherein at least a portion of the first time interval is not defined by the incomplete set;

generate a probabilistic work allocation based on the probabilistic values, wherein the probabilistic work allocation defines a probability distribution over a plurality of tasks, including the set of tasks, for a series of candidate time intervals associated with the first user, such that the probability distribution comprises the probabilistic values; and generate a usable data set of operational information based on the probabilistic work allocation;

a correlation component, executed by the at least one processor, configured to allocate at least a second time interval of the series of candidate time intervals having a second start time and a second end time to at least a first task of the set of tasks associated with the first user based on analysis of the usable data set of operational information, wherein allocating the second time interval constitutes an optimization of the automated modelling of resource allocation; and an adjustment component, executed by the at least one processor, configured to dynamically modify the second time interval responsive to automatically retrieving additional operational information over time, wherein dynamically modifying the second time interval comprises dynamically adjusting, by the computer system, the second time interval and the plurality of tasks, and wherein dynamically adjusting includes acts of reducing, modifying, or eliminating time intervals and/or tasks, by the computer system, responsive to processing, by the computer system, the additional operational information or additional data sources of operational information.

2. The system of claim 1, wherein the correlation component is further configured to allocate a third time interval having a third start time and a third end time to a second task of the set of tasks associated with the first user based on analysis of the usable data set of operational information.

3. The system of claim 2, wherein the correlation component—is further configured to allocate a fourth time interval having a fourth start time and a fourth end time to a third task of the set of tasks associated with the first user based on analysis of the usable data set operational information.

4. The system of claim 1, wherein the capture component includes at least a first application programming interface (API) configured to manage automatically retrieving the incomplete set of operational information from a software version control subsystem.

5. The system of claim 4, wherein the capture component includes at least a second API configured to manage automatically retrieving the incomplete set of operational information from a software ticketing system.

6. The system of claim 1, wherein the correlation component is configured to associate a plurality of users identities across a plurality of data sources to respective users and respective task based information.

7. The system of claim 6, wherein the correlation component is configured to allocate a plurality of time intervals to the first user based on analysis of the usable data set of operational information captured across the plurality of data sources.

8. The system of claim 7, wherein the system is further configured to dynamically adjust weights associated with the incomplete set of operational information responsive to corroboration of a first data source of the plurality of data sources, and dynamically adjust the weights associated with the incomplete set of operational information to corroboration of a second data source of the plurality of data sources.

9. The system of claim 8, wherein responsive to adjusted weights the correlation component is further configured to re-determine the second time interval for at least the first task.

10. The system of claim 9, wherein the correlation component is further configured to preferentially re-determine allocation of a plurality of time interval to time interval having no associated signal.

11. The system of claim 10, wherein the correlation component is further configured to apply a classification matrix to operational data received from a first data source, and the application of the classification matrix includes assigning a time interval ranges including a weighted minimum or weighted maximum time interval associated with a classification of a type of task associated with the first data source.

12. The system of claim 1, wherein the correlation component is further configured to identify time intervals having no associated signal and preferentially assign inferred time intervals associated with respective users to time intervals having no associated signal.

13. A method for optimizing automated modelling of resource allocation, the method comprising:

automatically retrieving, by a computer system, an incomplete set of operational information associated with a plurality of users, the incomplete set of operational information including a plurality of work interaction events associated with a first user of the plurality of users;

generating, by the computer system, probabilistic values indicative of respective probabilities that the first user worked on a set of tasks at a first time interval including a first start time and a first end time by extrapolating the plurality of work interaction events, wherein at least a portion of the first time interval is not defined by the incomplete set;

generating, by the computer system, a probabilistic work allocation based on the probabilistic values, wherein the probabilistic work allocation defines a probability distribution over a plurality of tasks, including the set of tasks, for a series of candidate time intervals associated with the first user, such that the probability distribution comprises the probabilistic values;

generating, by the computer system, a usable data set of operational information based on the probabilistic work allocation;

allocating, by the computer system, at least a second time interval of the series of candidate time intervals having a second start time and a second end time to at least a first task of the set of tasks associated with the first user based on analysis of the usable data set of operational information, wherein allocating the second time interval constitutes an optimization of the automated modelling of resource allocation; and dynamically modifying, by the computer system, the second time interval responsive to automatically retrieving additional operational information over time, wherein dynamically modifying the second time interval comprises dynamically adjusting, by the computer system, the second time interval and the plurality of tasks, and wherein dynamically adjusting includes acts of reducing, modifying, or eliminating time intervals and/or tasks, by the computer system, responsive to processing, by the computer system, the additional operational information or additional data sources of operational information.

14. The method of claim 13, wherein the act of allocating includes allocating, by the computer system, a third time interval having a third start time and a third end time to a second task of the set of tasks associated with the first user based on analysis of the usable data set of operational information.

15. The method of claim 14, wherein the act of allocating further includes allocating, by the computer system, a fourth time interval having a third start time and a third end time to a third task of the set of tasks associated with the first user based on analysis of the usable data set of operational information.

16. The method of claim 13, wherein the method further comprises:
executing at least a first application programming interface (API), and
managing, by the first API, automatically retrieving the incomplete set of operational information from a software version control subsystem.

17. The method of claim 13, wherein the act of allocating includes associating, by the computer system, a plurality of users identities across a plurality of data sources to respective users and respective task based information.

18. The method of claim 17, wherein the act of allocating includes allocating, by the computer system, a plurality of time intervals to the first user based on analysis of the usable data set of operational information captured across the plurality of data sources.

19. The method of claim 18, further comprising an act of dynamically weighting, by the computer system, operational information being analyzed responsive to corroboration of two or more data sources.

20. The method of claim 18, wherein method further comprises dynamically adjusting weights to operational information responsive to identifying correlations between at least two or more of the data sources.

21. The method of claim 13, wherein the method further comprising generating, by the computer system, associations between the operational information and inferred time periods required to accomplish the work.

22. The method of claim 13, wherein the method further comprises automatically generating, by the computer system, dependencies between elements of the operational information and overlapping or adjacent time intervals.

23. The method of claim 13, wherein the method further comprises preferentially re-determining, by the computer system, allocation of a plurality of time intervals to time intervals having no associated signal.

24. The method of claim 23, wherein the act of allocating includes: applying, by the computer system, a classification matrix to operational data received from a first data source; and assigning, by the computer system, a time interval range including a weighted minimum or weighted maximum time period associated with a classification of a type of task associated with the first data source.

* * * * *